US012327361B2

(12) United States Patent
Melapudi et al.

(10) Patent No.: US 12,327,361 B2
(45) Date of Patent: Jun. 10, 2025

(54) METHODS AND SYSTEMS FOR FAST THREE-DIMENSIONAL IMAGE SEGMENTATION AND ANNOTATION BY IMITATING WEAK SUPERVISION

(71) Applicant: GE Precision Healthcare LLC, Wauwatosa, WI (US)

(72) Inventors: Vikram Reddy Melapudi, Karnataka (IN); Krishna Seetharam Shriram, Karnataka (IN)

(73) Assignee: GE PRECISION HEALTHCARE LLC, Wauwatosa, WI (US)

( * ) Notice: Subject to any disclaimer, the term of this patent is extended or adjusted under 35 U.S.C. 154(b) by 379 days.

(21) Appl. No.: 18/146,914

(22) Filed: Dec. 27, 2022

(65) Prior Publication Data

US 2024/0212158 A1    Jun. 27, 2024

(51) Int. Cl.
*G06T 7/11*        (2017.01)
*G06T 7/174*       (2017.01)

(52) U.S. Cl.
CPC .............. *G06T 7/11* (2017.01); *G06T 7/174* (2017.01); *G06T 2200/04* (2013.01);
(Continued)

(58) Field of Classification Search
CPC . G06T 7/11; G06T 7/174; G06T 11/60; G06T 2200/04; G06T 2207/10016;
(Continued)

(56) References Cited

U.S. PATENT DOCUMENTS

| | | | |
|---|---|---|---|
| 2020/0026928 A1* | 1/2020 | Rhodes | ................... G06T 7/194 |
| 2024/0202932 A1* | 6/2024 | Kansara | ............... G06V 10/762 |
| 2024/0233347 A1* | 7/2024 | Ba | ......................... G06T 7/0012 |

FOREIGN PATENT DOCUMENTS

| | | | | |
|---|---|---|---|---|
| CN | 115131563 A | * | 9/2022 | |
| RU | 2742701 C1 | * | 2/2021 | ............... G06K 9/20 |

OTHER PUBLICATIONS

Bai et al. "Progressive medical image annotation with convolutional neural network-based interactive segmentation method." Medical Imaging 2021: Image Processing. Vol. 11596. SPIE, 2021. (Year: 2021).*

(Continued)

*Primary Examiner* — Katrina R Fujita
(74) *Attorney, Agent, or Firm* — McCoy Russell LLP

(57) ABSTRACT

Various methods and systems are provided for segmenting a three-dimensional (3D) region of interest (ROI) from an image sequence. In one embodiment, a method includes receiving a positive point selection or negative point selection for an ROI in a first image slice of an image sequence, mapping the first image slice and the positive point selection or negative point selection to a first segmentation mask of the ROI using a weakly supervised segmentation model, simulating positive and negative point selections in a second image slice based on the first segmentation mask to produce a plurality of simulated positive and negative point selections, wherein the second image slice is adjacent to the first image slice, and mapping the second image slice and the plurality of simulated positive and negative point selections to a second segmentation mask for the ROI in the second image slice using the weakly supervised segmentation model.

20 Claims, 9 Drawing Sheets

(52) U.S. Cl.
CPC .............. *G06T 2207/10016* (2013.01); *G06T 2207/20021* (2013.01); *G06T 2207/20076* (2013.01); *G06T 2207/20081* (2013.01); *G06T 2207/20101* (2013.01); *G06T 2207/30096* (2013.01)

(58) Field of Classification Search
CPC . G06T 2207/20021; G06T 2207/20076; G06T 2207/20081; G06T 2207/20101; G06T 2207/20104; G06T 2207/30096
See application file for complete search history.

(56) References Cited

OTHER PUBLICATIONS

Chen et al. "Scribblebox: Interactive annotation framework for video object segmentation." Computer Vision-ECCV 2020: 16th European Conference, Glasgow, UK, Aug. 23-28, 2020, Proceedings, Part XIII 16. Springer International Publishing, 2020. (Year : 2020).*

Liu et al. "isegformer: interactive segmentation via transformers with application to 3d knee mr images." International Conference on Medical Image Computing and Computer-Assisted Intervention. Cham: Springer Nature Switzerland, 2022. (Year: 2022).*

Oh et al. "Fast user-guided video object segmentation by interaction-and-propagation networks." Proceedings of the IEEE/CVF conference on computer vision and pattern recognition. 2019. (Year: 2019).*

Roth et al. "Weakly supervised segmentation from extreme points." Large-Scale Annotation of Biomedical Data and Expert Label Synthesis and Hardware Aware Learning for Medical Imaging and Computer Assisted Intervention: International Workshops, LABELS 2019, HAL-MICCAI 2019, and CURIOUS 2019 (Year: 2019).*

Shi et al. "A hybrid propagation network for interactive volumetric image segmentation." International Conference on Medical Image Computing and Computer-Assisted Intervention. Cham: Springer Nature Switzerland, 2022. (Year: 2022).*

Sofiiuk et al. "f-brs: Rethinking backpropagating refinement for interactive segmentation." Proceedings of the IEEE/CVF Conference on Computer Vision and Pattern Recognition. 2020. (Year: 2020).*

Sofiiuk et al. "Reviving iterative training with mask guidance for interactive segmentation." 2022 IEEE International Conference on Image Processing (ICIP). IEEE, 2022. (Year: 2022).*

Vujasinović et al. "Revisiting click-based interactive video object segmentation." 2022 IEEE International Conference on Image Processing (ICIP). IEEE, 2022. (Year: 2022).*

Sakinis, T. et al., "Interactive segmentation of medical images through fully convolutional neural networks," arXiv Cornell University Website, Available Online at https://arxiv.org/abs/1903.08205, Available as Early as Mar. 19, 2019, 10 pages.

Chen, X. et al., "FocalClick: Towards Practical Interactive Image Segmentation," arXiv Cornell University Website, Available Online at https://arxiv.org/abs/2204.02574, Available as Early as Apr. 6, 2022, 10 pages.

\* cited by examiner

METHODS AND SYSTEMS FOR FAST THREE-DIMENSIONAL IMAGE SEGMENTATION AND ANNOTATION BY IMITATING WEAK SUPERVISION

FIELD

Embodiments of the subject matter disclosed herein relate to segmentation and annotation of three-dimensional (3D) medical images using weakly supervised segmentation models.

BACKGROUND

Manually annotated medical images, wherein one or more regions of interest (ROIs) are segmented and labeled by a human expert, may be used as ground truth data in the training of machine learning (ML) models. As an example, a ML model may learn to automatically identify and/or segment tumors in medical images after undergoing a supervised training process, wherein the ML model attempts to match the performance of expert human annotators as encoded by a plurality of ground truth annotations of tumors (e.g., ground truth tumor segmentation masks). The difference between the ML model's predicted tumor segmentation masks and the ground truth tumor segmentation masks is used to calculate a loss for the predictions of the ML model, and parameters of the ML model are updated based on the loss to bring future predictions of the model into closer agreement with those of the ground truth data. In order to train robust ML image segmentation models, hundreds to hundreds of thousands of annotated ground truth images are used.

The number of expert person-hours involved in generating a sufficiently large and high-quality set of ground truth image annotations may be prohibitive. As an example, generation of a single ground truth annotation for a single ROI in a two-dimensional (2D) image may require the human annotator to draw contours on the 2D image, requiring on the order of 100 "clicks" to produce a sufficiently detailed 2D segmentation mask of the ROI. However, the amount of expert person-hours involved in producing detailed ground truth annotations is often much greater. For example, in a 3D image comprising 100 2D image slices, and containing seven ROIs, the human annotator may use on the order of $$70,000 \text{ "clicks"} \left(100 \text{ slices} \times 7 \text{ } ROIs \times 100 \frac{\text{clicks}}{\text{slice } ROI}\right)$$

to delineate the seven 3D ROIs. Thus, it is generally desired to explore approaches for more efficiently delineating ROIs in images, particularly 3D images, with a reduced reliance on human annotators.

BRIEF DESCRIPTION

In one embodiment, the disclosure provides a method for segmenting a 3D region from an image sequence by, receiving at least one positive point selection or negative point selection for a region of interest in a first image slice of the image sequence, mapping the first image slice and the at least one positive point selection or negative point selection to a first segmentation mask of the region of interest using a weakly supervised segmentation model, simulating positive and negative point selections in a second image slice based on the first segmentation mask to produce a plurality of simulated positive and negative point selections, wherein the second image slice is adjacent to the first image slice in the image sequence, and mapping the second image slice and the plurality of simulated positive and negative point selections to a second segmentation mask for the region of interest in the second image slice using the weakly supervised segmentation model. In this way, a 3D region of interest may be efficiently delineated by extending weak supervisory inputs received on a first image slice to a plurality of adjacent slices of the image sequence. In some instances, the approaches of the disclosure enable a reduction in the amount of expert annotator input used to delineate a 3D region of interest by several orders of magnitude (e.g., from $\sim 10^4$ "clicks" to $\sim 10$).

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The present invention will be better understood from reading the following description of non-limiting embodiments, with reference to the attached drawings, wherein below.

Figure 1:
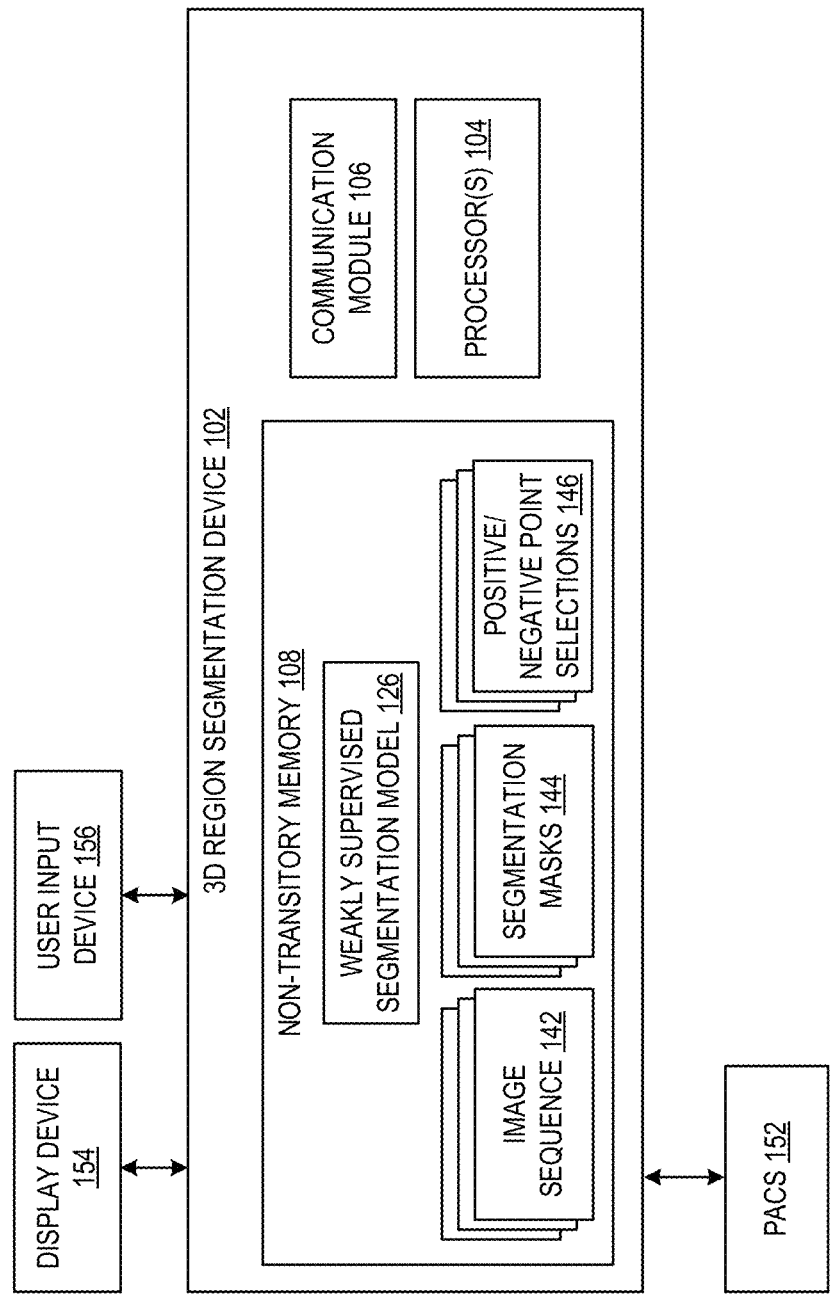
FIG. 1 illustrates a system for segmenting 3D regions of interest from image sequences, in accordance with an aspect of the disclosure.

DETAILED DESCRIPTION 3D image segmentation for annotation (e.g., generation of ground truth segmentation masks), is typically done by a human expert on a 2D surface/screen, and is a focus intensive and time-consuming task. The user may be required to draw contours on every slice of the 3D image to delineate the regions of interest. The inventors herein have developed systems and methods which may substantially speed up the task of 3D image segmentation by reducing human effort. In one embodiment, the current disclosure teaches leveraging weakly supervised segmentation in conjunction with simulation of positive and negative point selections, to automatically extend annotations made by a user on one or more image slices, to adjacent image slices, which in turn may be extended in an iterative fashion until all image slices of the image sequence are segmented/annotated and/or one or more stopping conditions have been satisfied.

As used herein, the term positive point selection refers to a region or point of an image designated as belonging to an ROI, whereas the term negative point selection refers to a region or point of an image designated as not belonging to an ROI (or in other words, a region or point of an image belonging to non-ROI portions of an image). Negative and/or positive point selections may be used as input to a weakly supervised segmentation model (also referred to herein as a weakly supervised model, or other similar terms), to provide "weak supervision" (e.g., supervision less than complete manual delineation of the region of interest) regarding which region(s) of the image to segment. As an example, an annotator may make several positive point selections inside of a tumor (e.g., by selecting said points using a user input device such as a mouse, touch screen, stylus, etc.) in an image slice and the annotator may make several negative point selections outside of the tumor. A weakly supervised segmentation model may then map the positive and negative point selections, along with the image slice, to a segmentation mask of the tumor. The annotator may refine the segmentation mask of the tumor by adding more positive or negative point selections, to provide more "supervision" to the weakly supervised segmentation model.

Although comprising points (e.g., labeled pixels or voxels) it should be understood that user selection of positive/negative points is not limited to selection of each point, individually (e.g., by providing one "click" per point selection), but may include selection of a region comprising a plurality of points (e.g., by positioning a bounding box or other shape over the region to be selected), free-from drawing (e.g., drawing a line, arc, or other curvilinear path of definite width, by moving a cursor, finger, or stylus), or other point or region selection mechanism known in the art of image annotation.

The inventors herein have discovered that by simulating/imitating weak supervision (e.g., positive and negative point selections) on image slices adjacent to an initially annotated/segmented image slice, weakly supervised 2D segmentation may be extended to 3D image segmentation in a computationally efficient manner, thus reducing reliance on expert human annotators and at least partially addressing the training data bottleneck which is a recognized limitation of image based machine learning.

The following description relates to various embodiments of methods and systems for segmenting 3D regions of interest in image sequences comprising a plurality of 2D image slices, or frames of 2D image videos/time series. The approaches of the current disclosure enable segmentation and labeling of 3D regions in image sequences, which may be used as ground truth segmentation masks for training one or more ML models, e.g., to identify one or more anatomical regions in 3D medical images. In another aspect, the current disclosure may also enable real-time segmentation of previously unseen 3D regions of interest from image sequences, e.g., a medical professional may utilize one or more of the methods or systems herein disclosed to segment a region of interest, in real-time, for which no ML segmentation model has been trained (or for which no ML segmentation model is currently available).

Figure 2:
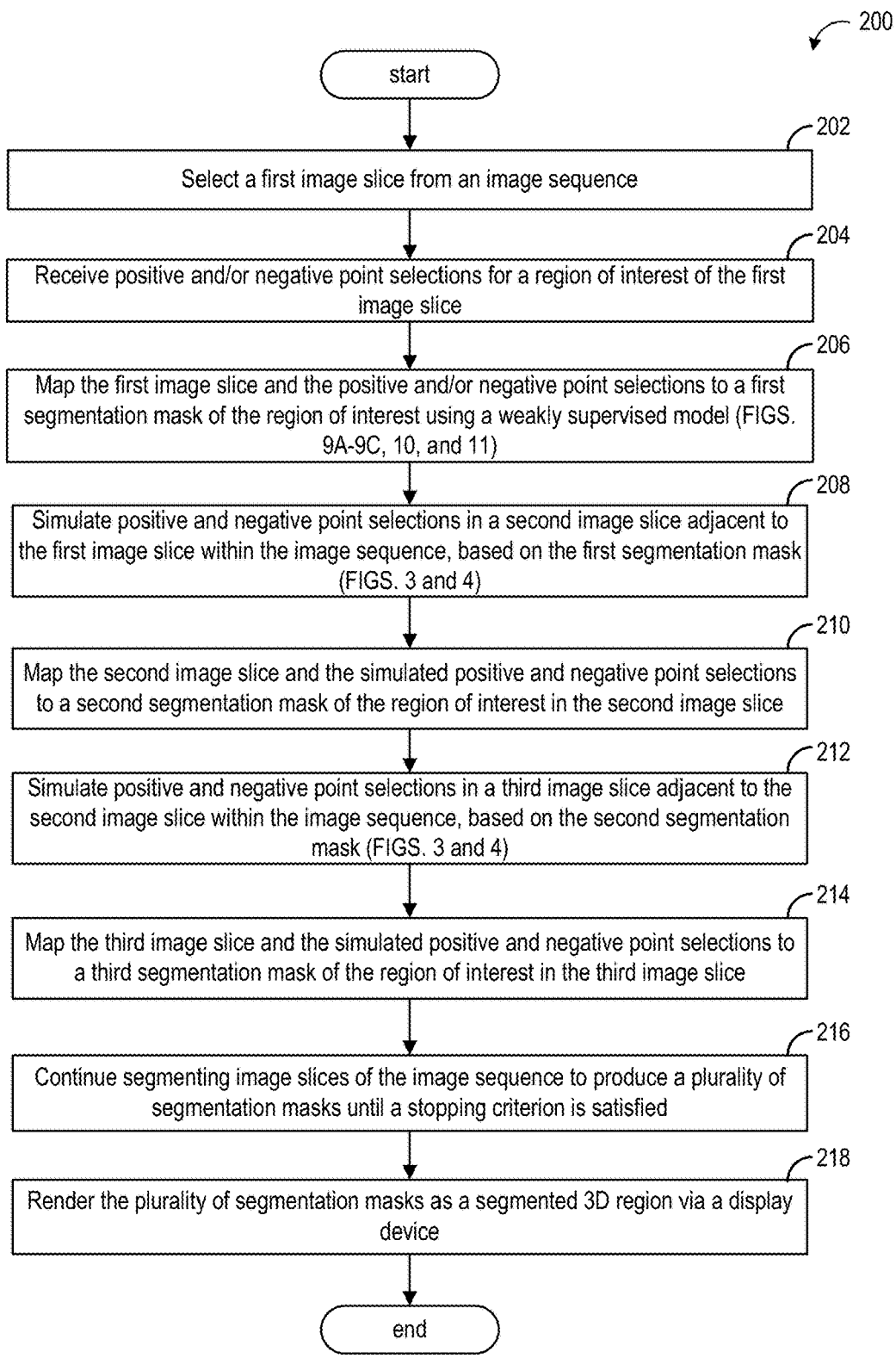
FIG. 2 shows a flowchart illustrating a high-level method for segmenting a 3D region of interest from an image sequence by extending weak supervision provided on a first image slice to one or more adjacent image slices, according to an embodiment of the disclosure.

In one example, 3D segmentation of image sequences may be performed by 3D region segmentation system 100, shown in FIG. 1, by executing one or more operations of method 200, shown in FIG. 2. Method 200 includes receiving positive and/or negative point selections for an initial image slice via a user input device, generating an initial segmentation mask, such as segmentation masks 902, 904, and 906, shown in FIGS. 9A, 9B, and 9C, based on the positive and/or negative point selections, by using a weakly supervised segmentation model. In some embodiments, methods herein disclosed may generate segmentation masks based on positive and/or negative point selections using a weakly supervised segmentation model, such as weakly supervised segmentation model 1050 shown in FIG. 10, by performing one or more of the operations of method 1100, shown in FIG. 11. Method 200 further includes simulating positive and negative point selections for image slices adjacent to the initial image slice based on the initial segmentation mask, again using the weakly supervised segmentation model. This process of simulating positive and negative point selections based on a segmentation mask of a neighboring image slice, and using the newly generated segmentation mask to in turn simulate positive and negative point selections for an additional, adjacent image slice, may be repeated until all image slices in an image sequence are processed, or a stopping condition is satisfied, as illustrated in method 500, shown in FIG. 5.

Figure 3:
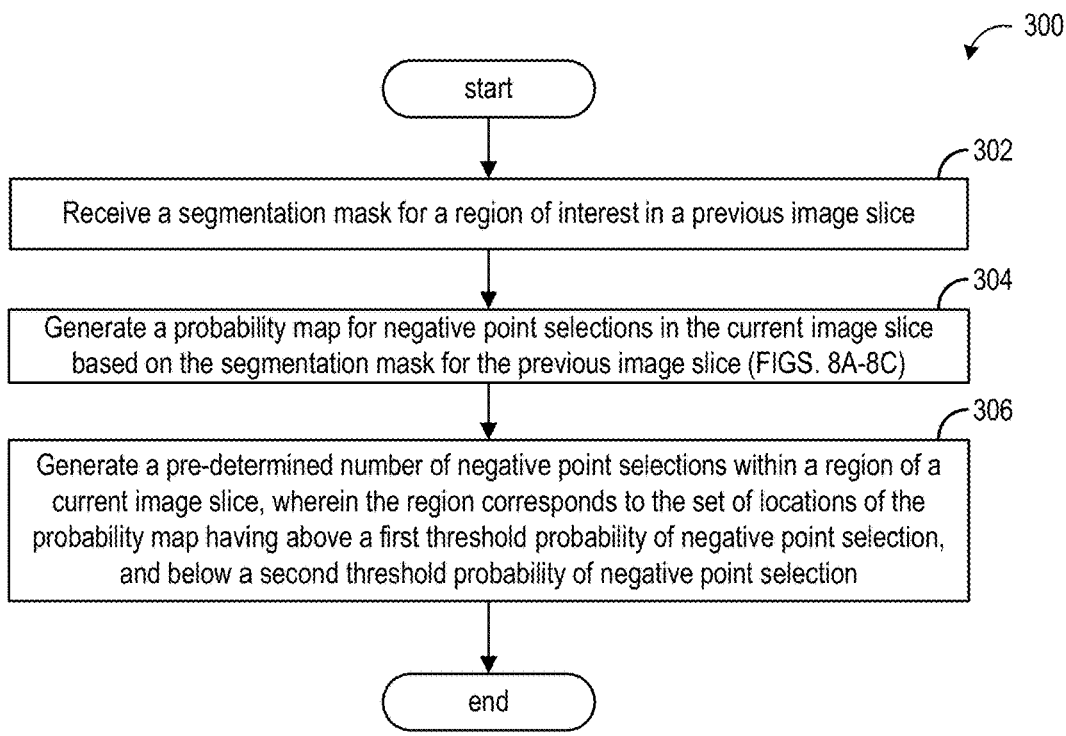
FIG. 3 shows a flowchart illustrating a high-level method for simulating negative point selections in an image slice of an image sequence, according to an embodiment of the disclosure.
Figure 4:
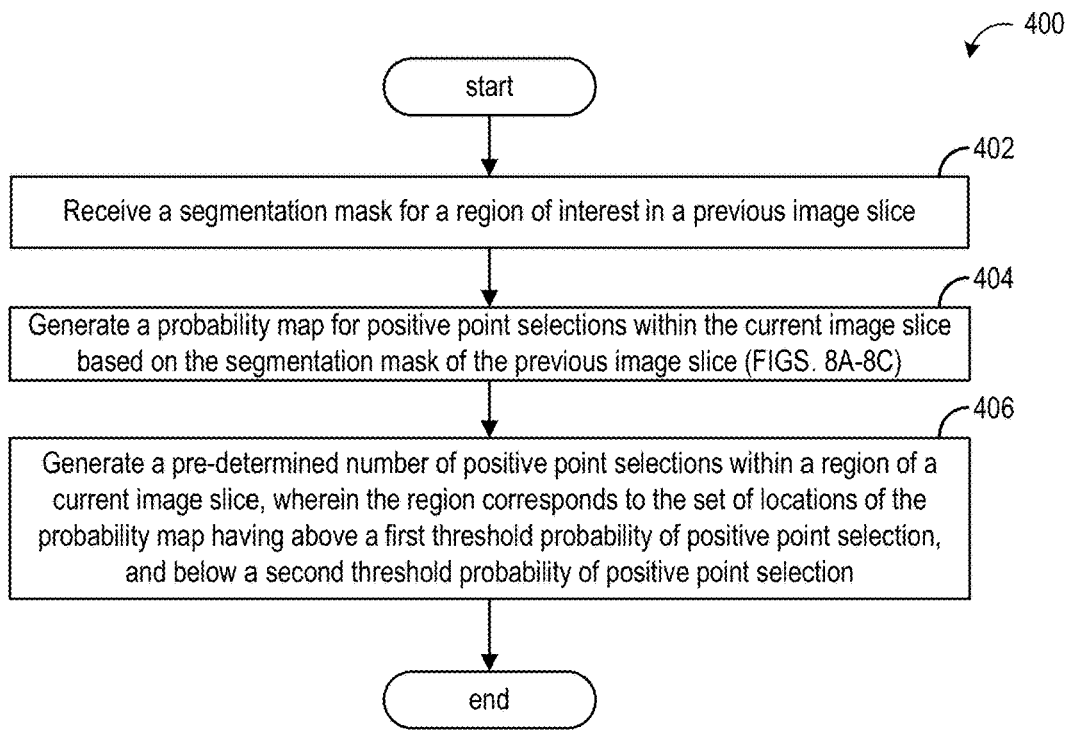
FIG. 4 shows a flowchart illustrating a high-level method for simulating positive point selections in an image slice of an image sequence, according to an embodiment of the disclosure.

Methods 300 and 400, shown in FIGS. 3, and 4, disclose methods of simulating said positive and negative point selections based on a probability map (or maps) produced using a segmentation mask of an adjacent image slice. FIGS. 8A, 8B, and 8C, respectively, provide an example of a segmentation mask 802, which may be used to generate a negative point selection probability map 804, and a positive point selection probability map 806, by performing one or more of the operations of methods 300 and/or 400. Refinement or adjustments to a segmented 3D region may be performed by updating one or more of the positive and/or negative point selections, according to one or more operations of methods 600 and/or 700, shown in FIGS. 6 and 7, respectively.

Embodiments of the present disclosure will now be described, by way of example, with reference to the figures, in which FIG. 1 schematically shows an example 3D region segmentation system 100 that may be implemented to segment and annotate 3D images, such as 3D medical images. In some embodiments, 3D region segmentation system 100 may be implemented in a medical facility, such as a hospital, to segment 3D regions of interest, e.g., anatomical regions, surgical implants, tumors, etc., based on one or more positive and/or negative point selections made by a user. In some embodiments, 3D region segmentation system 100 may be implemented to generate a ground truth dataset for training a 3D image segmentation model, e.g., by segmenting 3D regions of interest to produce ground truth 3D segmentation masks, and annotating said segmentation masks with a ground truth label.

The 3D region segmentation system 100 includes a 3D region segmentation device 102, communicatively coupled to a picture archiving and communication system (PACS) 152, a display device 154, and a user input device 156. The 3D region segmentation device 102 may include resources (e.g., non-transitory memory 108, processor(s) 104) that may be allocated to generate and store segmentation masks (e.g., segmentation masks 144), and positive/negative point selections (e.g., positive/negative point selections 146) for one or more image sequences (e.g., image sequence 142).

Non-transitory memory 108 includes one or more data storage structures, such as optical memory devices, magnetic memory devices, or solid-state memory devices, for storing programs and routines executed by processor(s) 104 to carry out various functionalities disclosed herein. Non-transitory memory 108 may include any desired type of volatile and/or non-volatile memory such as, for example, static random access memory (SRAM), dynamic random access memory (DRAM), video random access memory (VRAM), flash memory, read-only memory (ROM), etc.

Processor(s) 104 may be any suitable processor, processing unit, or microprocessor, for example. Processor(s) 104 may be a multi-processor system, and, thus, may include one or more additional processors that are identical or similar to each other and that are communicatively coupled via an interconnection bus.

In the example shown by FIG. 1, non-transitory memory 108 includes a single image sequence 142, comprising a plurality of 2D image slices, however it will be appreciated that non-transitory memory 108 may store a plurality of distinct image sequences, and a single image sequence 142 is shown in FIG. 1 for simplicity. Each of the 2D image slices of image sequence 142 may be associated with one or more positive and/or negative point selections stored in positive/negative point selections 146. The positive/negative point selections 146 may be generated based on user input, or simulated to mimic human input. Each 2D image slice of image sequence 142, along with associated positive/negative point selections from positive/negative point selections 146, may be mapped to a corresponding segmentation mask stored in segmentation masks 144 using a weakly supervised segmentation model 126. The weakly supervised segmentation model 126 may be stored in non-transitory memory 108, and configured to map 2D image slices of image sequence 142, and corresponding positive/negative point selections stored in positive/negative point selections 146, to 2D segmentation masks, wherein the generated 2D segmentation masks may be stored in non-transitory memory 108 at segmentation masks 144.

The 3D region segmentation device 102 may access or receive images from PACS 152 and/or additional medical image databases. PACS 152 may store medical images such as ultrasound images, MRI images, X-ray images, CT images, PET images, etc. in memory. PACS 152 may store images and communicate according to the DICOM image file format. PACS 152 may be a database stored in a mass storage device configured to communicate with remote devices via secure channels (e.g., HTTPS and TLS), and store data in encrypted form.

In some embodiments, image sequence 142 may include N 2D image slices (wherein N is a positive integer greater than 1). The 3D region segmentation device 102 may receive one or more positive and/or negative point selections in one or more of the 2D image slices, via user input device 156, and store said positive and/or negative point selections in non-transitory memory 108 (e.g., at positive/negative point selections 146). In some embodiments, the positive and/or negative point selections (either made via user input device 156 or simulated according to one or more operations of methods disclosed herein) may be stored at positive/negative point selections 146 and indexed according to a 2D image slice for which the positive/negative point selection was made. As an example, if a user makes a positive point selection in a $10^{th}$ 2D image slice of an image sequence, the positive point selection (e.g., the coordinates of the positive point selection within a coordinate system of the 2D image slice) may be stored at positive/negative point selections 146 and indexed as belonging to a $10^{th}$ 2D image slice of the image sequence 142. In another embodiment, the positive and negative point selections may be stored as coordinates of a point in 3D space, e.g., a first coordinate for the x position of the point in the 2D image, a second coordinate for the y position of the point in the 2D image, and a third coordinate for the z position of the point in a 3D image space, which in some embodiments may comprise an index of the 2D image slice within the image sequence 142. The positive/negative point selections may further be stored along with an indication of whether the point is a positive point selection or a negative point selection (e.g., the point selections may include a binary indicator such as a 1 for positive point selections and 0 for negative point selections).

Similarly, a segmentation mask generated for a 2D image slice may be stored at segmentation masks 144 and indexed according to a position of the 2D image slice within the image sequence 142. As an example, a segmentation mask generated for an $8^{th}$ 2D image slice of image sequence 142 may be indexed as belonging to the $8^{th}$ 2D image slice.

Renderings of segmented 3D regions may be displayed via display device 154, along with one or more of the positive and negative point selections used in the generation of the segmented 3D region. In one example, a segmented 3D region of interest may comprise a plurality of 2D segmentation masks (such as those stored at segmentation masks 144), which may be superimposed over the plurality of 2D image slices comprising the image sequence 142. Display of the user selected and/or simulated positive and negative point selections via the display device 154 enables a user to easily identify and adjust the "weak supervision" provided to the weakly supervised segmentation model 126, thus enabling a user to refine or edit the segmented 3D region of interest by adding or removing one or more positive and/or negative point selections, e.g., via a request input via a user input device (as discussed in more detail below with reference to FIGS. 6 and 7). The display device 154 may comprise a screen, monitor, or other display device. The user input device 156 may include a keyboard, mouse, microphone, touch screen, stylus, or other device.

The 3D region segmentation device 102 further includes a communication module 106. Communication module 106 facilitates transmission of electronic data within and/or among one or more systems. Communication via communication module 106 can be implemented using one or more protocols. In some examples, communication via communication module 106 occurs according to one or more standards (e.g., Digital Imaging and Communications in Medicine (DICOM), Health Level Seven (HL7), ANSI X12N, etc.). Communication module 106 can be a wired interface (e.g., a data bus, a Universal Serial Bus (USB) connection, etc.) and/or a wireless interface (e.g., radio frequency, infrared, near field communication (NFC), etc.). For example, communication module 106 may communicate via wired local area network (LAN), wireless LAN, wide area network (WAN), etc. using any past, present, or future communication protocol (e.g., BLUETOOTH™, USB 2.0, USB 3.0, etc.).

As used herein, the terms "sensor," "system," "unit," or "module" may include a hardware and/or software system that operates to perform one or more functions. For example, a sensor, module, unit, or system may include a computer processor, controller, or other logic-based device that performs operations based on instructions stored on a tangible and non-transitory computer readable storage medium, such as a computer memory. Alternatively, a sensor, module, unit, or system may include a hard-wired device that performs operations based on hard-wired logic of the device. Various modules or units shown in the attached figures may represent the hardware that operates based on software or hard-wired instructions, the software that directs hardware to perform the operations, or a combination thereof.

"Systems," "units," "sensors," or "modules" may include or represent hardware and associated instructions (e.g., software stored on a tangible and non-transitory computer readable storage medium, such as a computer hard drive, ROM, RAM, or the like) that perform one or more operations described herein. The hardware may include electronic circuits that include and/or are connected to one or more logic-based devices, such as microprocessors, processors, controllers, or the like. These devices may be off-the-shelf devices that are appropriately programmed or instructed to perform operations described herein from the instructions described above. Additionally or alternatively, one or more of these devices may be hard-wired with logic circuits to perform these operations.

One or more of the devices described herein may be implemented over a cloud or other computer network. For example, 3D region segmentation device 102 is shown in FIG. 1 as constituting a single entity, but it is to be understood that 3D region segmentation device 102 may be distributed across multiple devices, such as across multiple servers. Further, while the elements of FIG. 1 are shown as being housed at a single medical facility, it is to be appreciated that any of the components described herein (e.g., PACS 152, etc.) may be located off-site or remote from the 3D region segmentation device 102. Further, the data utilized by the 3D region segmentation device 102 for generation of 3D segmented regions of interest, and other tasks described below, could come from systems within the medical facility or obtained through electronic means (e.g., over a network) from other referring institutions.

Referring to FIG. 2, an exemplary method 200 for generating a 3D segmented region by simulating weak supervisory inputs is shown. Method 200 may be executed by a computing system, such as the 3D region segmentation system 100 shown in FIG. 1. Method 200 may be executed during generation of a ground truth training dataset for training one or more machine learning models to map images (particularly 3D images) to segmentation masks (particularly 3D segmentation masks). Alternatively, method 200 may be executed to efficiently segment an arbitrary 3D region of interest from an image sequence, wherein the 3D region of interest may be used in one or more downstream tasks, e.g., for measuring a volume of the 3D region of interest, assisting medical personnel in evaluating a patient's medical condition, and/or planning a surgical intervention (e.g., demarcating an extent of a tumor).

Method 200 begins at operation 202, wherein the 3D region segmentation system selects a first image slice from an image sequence. In some embodiments, the 3D region segmentation system may select the first image slice based on input received from a user input device. In one example, a user may click on a point in a 3D image, displayed via a display device, and the 3D region segmentation system may select a 2D image slice corresponding to the point selected by the user. In some embodiments, the 3D region segmentation system may automatically select the first image slice from a plurality of 2D image slices composing an image sequence.

At operation 204, the 3D region segmentation system receives positive and/or negative point selections for a region of interest of the first image slice. As used herein, positive point selections refer to points of an image including or inside of a region of interest, whereas negative point selections refer to points not included within, or outside of, the region of interest. As an example, an annotator may make several positive point selections inside of a first anatomical region (e.g., by selecting said points using a user input device such as a mouse, touch screen, stylus, etc.) in the first image slice and the annotator may make several negative point selections outside of the first anatomical region. Operation 204 may include the 3D region segmentation system receiving either one or more positive point selections, or one or more negative point selections, or both positive and negative point selections, via input received from a user input device. Briefly turning to FIGS. 9B and 9C, segmentation mask 904 is generated from a single positive point selection, whereas segmentation mask 906 is generated from a single positive point selection and four negative point selections.

In some embodiments, operation 204 includes the 3D region segmentation system receiving one or more positive or negative point selections for an image slice intersecting the first image slice, wherein a plane of the first image slice is intersected by a plane of the intersecting image slice at an angle. In some embodiments, the intersecting image slice may be orthogonal to the first image slice, that is, an angle formed between a plane of the first image slice and the plane of the intersecting image slice may be 90 degrees. Positive and/or negative point selections made in the intersecting image slice may be mapped to a coordinate system of the image sequence, and used along with the simulated positive and negative point selections as input to a weakly supervised model to produce segmentation masks for image slices of the image sequence. As an example, positive and/or negative point selections made in the intersecting image slice may intersect with a second image slice, wherein the second image slice is parallel with the first image slice. The intersecting positive and/or negative point selections made in the intersecting image slice may be mapped, along with the second image slice and simulated positive and negative point selections, to a segmentation mask for the second image slice using a weakly supervised model.

Figure 9C:
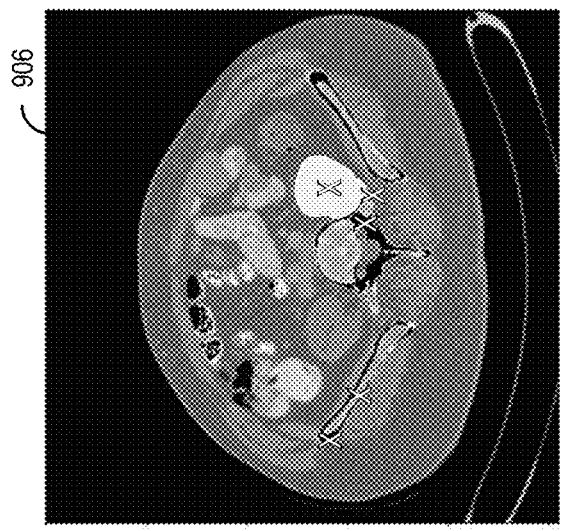
FIGS. 9A-9C show comparisons between 2D segmentation masks produced for an image slice with zero point selections, one positive point selection, or one positive and four negative point selections, according to an embodiment of the disclosure.
Figure 9B:
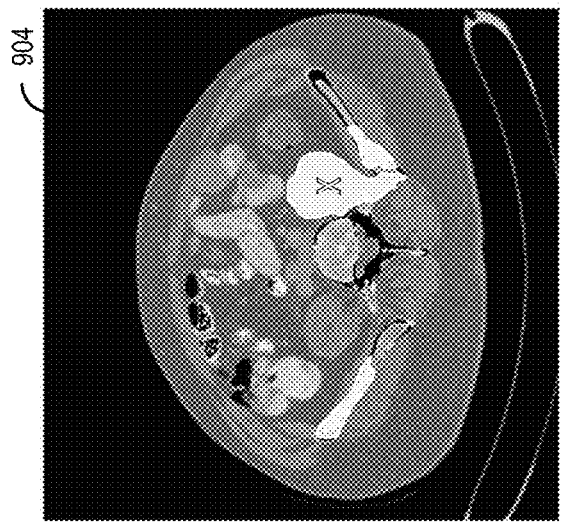
Figure 9A:
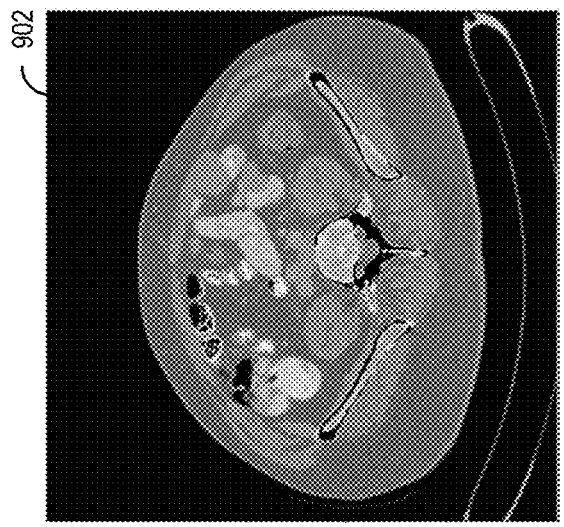

At operation 206, the 3D region segmentation system maps the first image slice and the positive and/or negative point selections to a first segmentation mask of the region of interest using a weakly supervised model. Briefly, a weakly supervised segmentation model comprises a machine learning system configured to segment an image based on positive and negative point selections in a "bottom up" fashion. The weakly supervised segmentation model precludes negative point selections from being included in the segmentation mask, while ensuring positive point selections are included in the segmentation mask. Referring briefly to FIGS. 9A, 9B, and 9C, several examples of segmentation masks generated by a weakly supervised segmentation model based on positive/negative point selections are shown. First segmentation mask 902 was generated from a 2D image slice with neither positive nor negative point selections, and as can be seen, the weakly supervised segmentation model has identified no ROI within the image. Second segmentation mask 904 is produced based on a single positive point selection within an ROI. As can be seen, second segmentation mask 904 correctly segments the region of interest, but also includes additional regions outside of the ROI as part of the segmentation mask. Third segmentation mask 906 is produced using one positive point selection and four negative point selections, wherein the negative point selections preclude the spurious ROIs included in the second segmentation mask from being included in the third segmentation mask. As can be seen, the third segmentation mask no longer includes the spurious ROIs, and correctly captures the desired ROI.

At operation 208, the 3D region segmentation system simulates positive and negative point selections in a second image slice adjacent to the first image slice within the image sequence, based on the first segmentation mask, as discussed in more detail in the description of FIGS. 3 and 4, below. Briefly, probability map(s) indicating a probability of negative and/or positive point selection for each pixel/location within the second image slice may be generated based the segmentation mask of the first image slice. A pre-determined number of positive and negative point selections may then be simulated by placing the pre-determined number of positive and negative point selections at locations of the second image slice based on the probability map(s). Thus, the weak supervision provided by a user (in the form of positive and/or negative point selections) on the first image slice may be simulated on the second image slice, without requiring any additional input from the user.

At operation 210, the 3D region segmentation system maps the second image slice and the simulated positive and negative point selections to a second segmentation mask of the region of interest in the second image slice. Operation 210 is substantially similar to that of operation 206 above, however, in the case of operation 210 the positive and negative points are simulated, rather than being received via a user input device, and it is the second image slice (instead of the first image slice) being mapped to the second segmentation mask.

At operation 212, the 3D region segmentation system simulates positive and negative point selections in a third image slice adjacent to the second image slice within the image sequence, based on the second segmentation mask. Operation 212 is substantially similar to operation 208, described above, however, the simulated positive and negative point selections of operation 212 are generated based off of the second segmentation mask, as opposed to the first segmentation mask.

At operation 214, the 3D region segmentation system maps the third image slice and the simulated positive and negative point selections to a third segmentation mask of the region of interest in the third image slice. Operation 214 is substantially similar to that of operation 206 above, however, in the case of operation 214 the positive and negative points are simulated, rather than being received via a user input device, and it is the third image slice (instead of the first image slice) being mapped to the third segmentation mask.

At operation 216, the 3D region segmentation system continues segmenting image slices of the image sequence to produce a plurality of segmentation masks until a stopping criterion is satisfied. As can be seen, once the first segmentation mask is generated, positive and negative point selections may be simulated in an adjacent image slice (or slices), and used to generate a second segmentation mask (or masks). This process may be repeated to generate a third segmentation mask, a fourth segmentation mask, and so on until a stopping criterion is satisfied. In some embodiments, stopping criteria may include a size/area of a segmented region of interest in a current segmentation mask decreasing to below a size/area threshold, and or all images in a direction of propagation of the image sequence have been segmented.

At operation 218, the 3D region segmentation system renders the plurality of segmentation masks as a segmented 3D region via a display device. Following operation 218, method 200 may end. In this way, a 3D region of interest may be segmented from a plurality of 2D image slices comprising an image sequence by simulating weak supervisory inputs in the form of positive and negative point selections in one or more slices based on positive and/or negative point selections received via a user input device in one or more "initial" 2D image slices. Thus, method 200 enables segmentation of regions of interest from 3D images using a reduced number of user inputs, and further enabling segmentation of regions of interest absent in a training dataset of one or more available segmentation models.

Referring to FIG. 3, an exemplary method 300 for simulating negative point selections for a current image slice based on a segmentation mask of a previous/adjacent image slice is shown. Method 300 may be executed by a computing system, such as the 3D region segmentation system 100 shown in FIG. 1. Method 300 may be executed as part of another method herein disclosed, such as in method 200 at operation 208 and operation 212.

Method 300 begins at operation 302, wherein the 3D region segmentation system receives a segmentation mask for a region of interest in a previous image slice. As an example, the previous image slice may be an initially annotated image slice, such as the first image slice of method 200, wherein the current image slice would be a second image slice. As another example, the previous image slice may be an $i-1^{th}$ image slice, wherein the current image slice is an $i^{th}$ image slice, and wherein i is an index over the image slices of an image sequence (wherein i may go from 0 to N, wherein N is the number of image slices comprising the image sequence). In some embodiments, the segmentation mask for the region of interest in the previous image slice may comprise a binary mask, wherein pixels/regions classified as belonging to the ROI may be set as a first value (e.g., 1) while pixels/regions classified as not belonging to the ROI (that is, non-ROI) may be set as a second value (e.g., 0), wherein the first value and the second value are not the same.

At operation 304, the 3D region segmentation system generates a probability map for negative point selections for the current image slice based on the previous segmentation mask. In some embodiments, determining a probability of negative point selection may be based on a distance (e.g., a number of pixels) from ROI regions in the previous segmentation mask, wherein a probability of negative point selection is set to zero in ROI regions, and wherein the probability of negative point selection increases as a distance from ROI regions in the previous segmentation mask increases. In some embodiments, a signed distance function may be used to determine a probability of negative point selections in a current image slice, based on the segmentation mask of a previous/adjacent image slice.

At operation 306, the 3D region segmentation system generates a pre-determined number of negative point selections within a region of a current image slice, wherein the region corresponds to the set of locations of the probability map having above a first threshold probability of negative point selection, and below a second threshold probability of negative point selection. The inventors herein have discovered that, negative point selections made within regions of an image having close to zero probability of negative point selection may overlap (occur within) the region of interest, which may preclude said region of interest from being segmented correctly by the weakly supervised segmentation model. Conversely, negative point selections made within regions of an image having very large probabilities of negative point selection (e.g., close to 1), provide little or no useful information to the weakly supervised segmentation model, while increasing a computational complexity. Thus, the inventors herein have determined that simulation of negative point selections advantageously occurs at locations of a current image having a probability of negative point selection above a first threshold, and below a second threshold. In some embodiments, the first threshold may be set to 0.05, and the second threshold may be set to 0.85. Further, the inventors have determined that a tradeoff exists between a number of simulated negative point selections and a computational complexity of the weakly supervised segmentation. Thus, the pre-determined number of negative point selections may advantageously be in the range of 3-12 (inclusive). Following operation 306, method 300 may end.

Referring to FIG. 4, an exemplary method 400 for simulating positive point selections for a current image slice based on a segmentation mask of a previous/adjacent image slice is shown. Method 400 may be executed by a computing system, such as the 3D region segmentation system 100 shown in FIG. 1. Method 400 may be executed as part of another method herein disclosed, such as in method 200 at operation 208 and operation 212.

Method 400 begins at operation 402, wherein the 3D region segmentation system receives a segmentation mask for a region of interest in a previous image slice. As an example, the previous image slice may be an initially annotated image slice, such as the first image slice of method 200, wherein the current image slice would be a second image slice. As another example, the previous image slice may be an i-1$^{th}$ image slice, wherein the current image slice is an i$^{th}$ image slice, and wherein i is an index over the image slices of an image sequence (wherein i may go from 0 to N, wherein N is the number of image slices comprising the image sequence). In some embodiments, the segmentation mask for the region of interest in the previous image slice may comprise a binary mask, wherein pixels/regions classified as belonging to the ROI may be set as a first value (e.g., 1) while pixels/regions classified as not belonging to the ROI (that is, non-ROI) may be set as a second value (e.g., 0), wherein the first value and the second value are not the same.

At operation 404, the 3D region segmentation system generates a probability map for positive point selections for the current image slice based on the previous segmentation mask. In some embodiments, determining a probability of positive point selection may be based on a distance (e.g., a number of pixels) from non-ROI regions in the previous segmentation mask, wherein a probability of positive point selection is set to zero in non-ROI regions, and wherein the probability of positive point selection increases as a distance from non-ROI regions in the previous segmentation mask increases. In some embodiments, a signed distance function may be used to determine a probability of positive point selections in a current image slice, based on the segmentation mask of a previous/adjacent image slice.

At operation 406, the 3D region segmentation system generates a pre-determined number of positive point selections within a region of a current image slice, wherein the region corresponds to the set of locations of the probability map having above a first threshold probability of positive point selection, and below a second threshold probability of positive point selection. The inventors herein have discovered that, positive point selections made within regions of an image having close to zero probability of positive point selection may occur outside of ROI portions of the current image, which may cause the weakly supervised segmentation model to spuriously include non-ROI portions of the current image as part of the segmentation mask for the current image. Conversely, positive point selections made within regions of an image having very large probabilities of positive point selection (e.g., close to 1), provide little or no useful information to the weakly supervised segmentation model, while increasing a computational complexity. Thus, the inventors herein have determined that simulation of positive point selections advantageously occurs at locations of a current image having a probability of positive point selection above a first threshold, and below a second threshold. In some embodiments, the first threshold may be set to 0.05, and the second threshold may be set to 0.85. Further, the inventors have determined that a tradeoff exists between a number of simulated positive point selections and a computational complexity of the weakly supervised segmentation. Thus, the pre-determined number of positive point selections may advantageously be in the range of 1-12 (inclusive). Following operation 406, method 400 may end.

Figure 5:
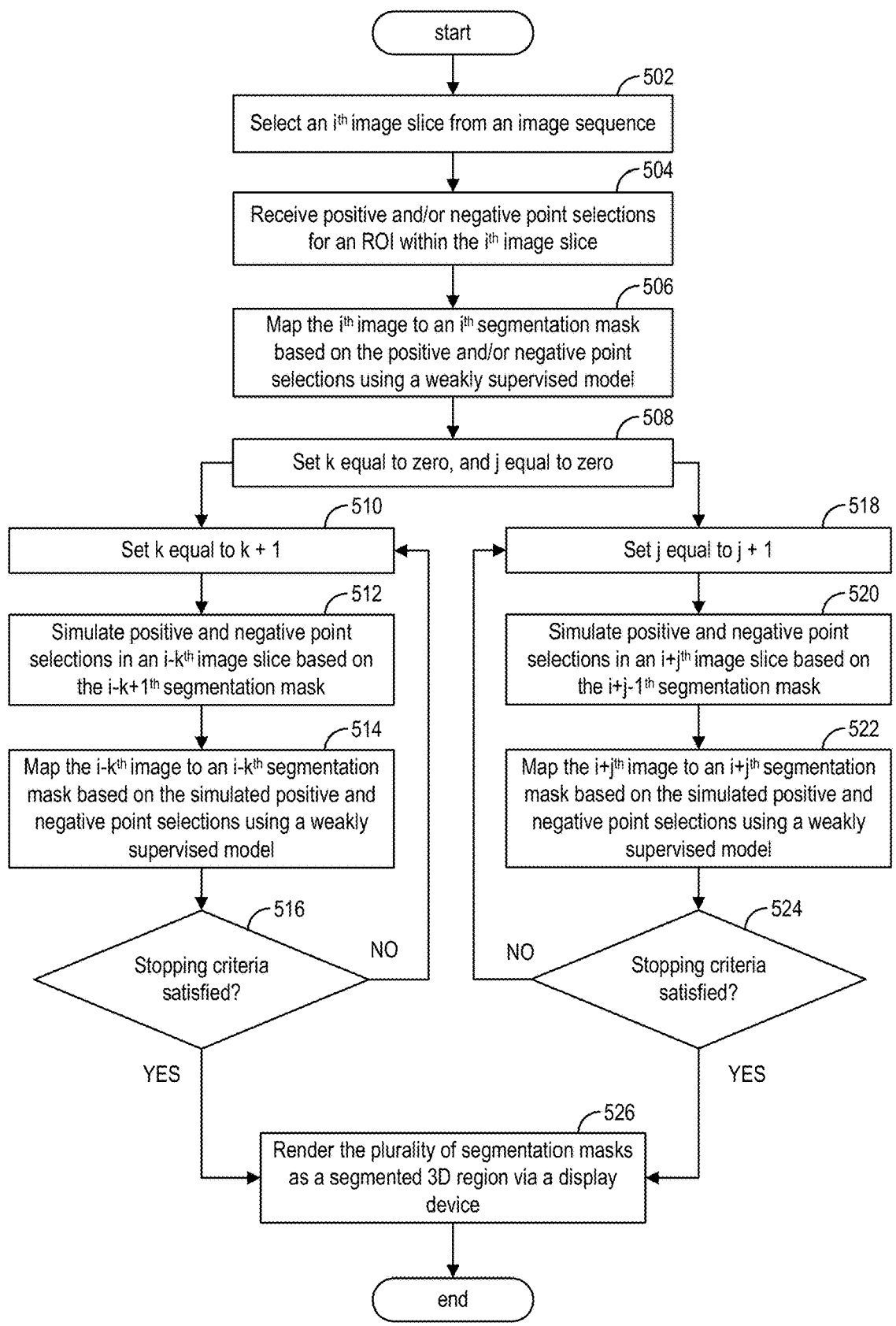
FIG. 5 shows a flowchart illustrating a high-level method for segmenting a 3D region of interest from an image sequence by extending weak supervision provided on a first image slice to one or more adjacent image slices in both a first and second direction, according to an embodiment of the disclosure.

Referring to FIG. 5, an exemplary method 500 for efficiently generating a 3D segmented region in an image sequence is shown. Method 500 includes propagating weak supervisory inputs received at an i$^{th}$ image slice in both a first direction (a k direction) and a second direction (a j direction), in parallel, in a recursive fashion, until one or more stopping conditions are satisfied. Method 500 may be executed by a computing system, such as the 3D region segmentation system 100 shown in FIG. 1. Method 500 may be executed during generation of a ground truth training dataset for training one or more machine learning models to map images to segmentation masks. In some embodiments, method 500 may be executed to efficiently segment an arbitrary 3D region of interest from an image sequence, wherein the 3D region of interest may be used in one or more downstream tasks, e.g., for measuring a volume of the 3D region of interest, assisting medical personnel in evaluating a patient's medical condition, and/or planning a surgical intervention (e.g., demarcating an extent of a tumor).

Method 500 begins at operation 502, wherein the 3D region segmentation system selects an $i^{th}$ image slice from an image sequence. In some embodiments, the 3D region segmentation system may select the $i^{th}$ image slice based on input received from a user input device, wherein "i" is an integer value indicating the position of the selected image slice within the image sequence. In one example, a user may click on a point in a 3D image, displayed via a display device, and the 3D region segmentation system may select a 2D image slice corresponding to the point selected by the user. In some embodiments, the 3D region segmentation system may automatically select the $i^{th}$ image slice from a plurality of 2D image slices comprising the image sequence.

At operation 504, the 3D region segmentation system receives positive and/or negative point selections for an ROI within the $i^{th}$ image slice. Operation 504 may include the 3D region segmentation system receiving either one or more positive point selections, or one or more negative point selections, or both positive and negative point selections, via input received from a user input device. In some embodiments, operation 504 may include the 3D segmentation system receiving a plurality of positive and/or negative point selections from a user input device, wherein the user input device may comprise a touchscreen, a mouse, or other user input devices known in the art. In some embodiments, a user may make a selection of a region, comprising a plurality of points, by circumscribing the region (e.g., by using a stylus, mouse, or touchscreen), or positioning and sizing a shape to encapsulate the region. In some embodiments, the 3D region segmentation system may receive a plurality of positive and/or negative point selections comprising a curvilinear path of finite width, selected via stylus, mouse, or touchscreen.

At operation 506, the 3D region segmentation system maps the $i^{th}$ image to an $i^{th}$ segmentation mask based on the positive and/or negative point selections using a weakly supervised segmentation model. See the description of FIGS. 10 and 11 for a more detailed description of one embodiment of a weakly supervised segmentation model. Briefly, a weakly supervised segmentation model comprises a machine learning model configured to segment an image based on "signal" or weak supervision, comprising positive and negative point selections. The weakly supervised segmentation model precludes negative point selections from the segmentation mask, while ensuring positive point selections are included in the segmentation mask. In some embodiments, the weakly supervised segmentation model produces a binary segmentation mask, comprising a grid of labels (e.g., 1's and 0's) corresponding to pixels of the $i^{th}$ image, wherein the labels indicate if a corresponding pixel belongs to the ROI indicated by the positive point selections (e.g., a pixel with a corresponding label of 1 belongs to the ROI, whereas pixels with labels of 0 do not belong to the ROI, or in other words belong to non-ROI).

At operation 508, the 3D region segmentation system sets k equal to zero, and j equal to zero. The terms k and j refer to indices for counting a distance from the $i^{th}$ image, within the image sequence (wherein distance is measured by a number of image slices), in a first direction, and a second direction, respectively. As an example, if the $i^{th}$ image is a $5^{th}$ image slice in an image sequence (i.e., i=5), than a $10^{th}$ image slice may be considered to be a distance of 5 away from the $i^{th}$ image slice in a first direction (e.g., 5 images "above" the $i^{th}$ image slice), and may correspond to a j value of 5, whereas a $3^{rd}$ image slice in the image sequence may be considered to be a distance of 2 away from the $i^{th}$ image slice in a second direction (e.g., 2 images "below" the $i^{th}$ image slice), and may correspond to a k value of 2.

At operation 510, the 3D region segmentation system sets k equal to k+1. As an example, at a first occurrence of operation 510, the 3D region segmentation system increments the index k from a value of 0, to a value of 1. At each occurrence of operation 510, the 3D region segmentation systems increments the index for counting a distance of propagation of the segmented 3D region in the first direction (that is, index k).

At operation 512, the 3D region segmentation system simulates positive and negative point selections in an i-$k^{th}$ image slice based on the i-k+$1^{th}$ segmentation mask. Probability map(s) indicating a probability of negative and positive point selection for each pixel/location within the i-$k^{th}$ image slice may be generated based the segmentation mask of the i-k+$1^{th}$ image slice. A pre-determined number of positive and negative point selections may then be simulated by placing the pre-determined number of positive and negative point selections at locations of the i-$k^{th}$ image slice based on the probability map(s). As an example, if the $i^{th}$ image slice is a $29^{th}$ image slice in an image sequence, then at a first occurrence of operation 512 (wherein k=1), the 3D region segmentation system simulates positive and negative point selections in a $28^{th}$ image slice based on the segmentation mask of the $29^{th}$ image slice. Continuing with the above example, at a second occurrence of operation 512 (k=2), the 3D region segmentation system simulates positive and negative point selections in a $27^{th}$ image slice based on the segmentation mask of the $28^{th}$ image slice.

At operation 514, the 3D region segmentation system maps the i-$k^{th}$ image slice to an i-$k^{th}$ segmentation mask based on the simulated positive and negative point selections using the weakly supervised segmentation model. As an example, if i=14, at a first occurrence of operation 514 (k=1), the 3D region segmentation system maps the $13^{th}$ image slice to a $13^{th}$ segmentation mask based on the positive and negative point selections simulated at a operation 512, wherein $13^{th}$ indicates the image slice to which the segmentation mask corresponds, not that the segmentation mask is number $13^{th}$ produced segmentation mask.

At operation 516, the 3D region segmentation system determines if one or more stopping criteria are satisfied. In some embodiments, stopping criteria may include an area of an ROI in the i-$k^{th}$ segmentation mask being less than an ROI area threshold, or the i-$k^{th}$ image slice being a last image slice in the image sequence in the first direction. If at operation 516 the 3D region segmentation system determines that a stopping criterion is not satisfied, method 500 may return to operation 510, where k may be incremented and a segmentation mask for the i-$k^{th}$ image slice may be determined as described above with reference to operations 510-516. However, if at operation 516 the 3D region segmentation system determines that a stopping criterion is satisfied, method 500 may proceed to operation 526.

Operations 510-516 of method 500 may be referred to as a first branch of method 500, whereas operations 518-524 may be referred to as a second branch of method 500. In some embodiments, operations of the first branch and the second branch may be performed in parallel, thereby increasing a speed of execution of method 500. In some embodiments, the first branch and the second branch of method 500 may be executed in series. The second branch of method 500 is described below.

At operation 518, the 3D region segmentation system sets j equal to j+1. As an example, at a first occurrence of operation 518, the 3D region segmentation system increments the index j from a value of 0, to a value of 1. At each occurrence of operation 518, the 3D region segmentation systems increments the index for counting a distance of propagation of the segmented 3D region in the second direction (that is, index j).

At operation 520, the 3D region segmentation system simulates positive and negative point selections in an $i+j^{th}$ image slice based on the $i+j-1^{th}$ segmentation mask. Probability map(s) indicating a probability of negative and positive point selection for each pixel/location within the $i+j^{th}$ image slice may be generated based the segmentation mask of the $i+j-1^{th}$ image slice. A pre-determined number of positive and negative point selections may then be simulated by placing the pre-determined number of positive and negative point selections at locations of the $i+j^{th}$ image slice based on the probability map(s). As an example, if the $i^{th}$ image slice is a $29^{th}$ image slice in an image sequence, then at a first occurrence of operation 520 (wherein j=1), the 3D region segmentation system simulates positive and negative point selections in a $30^{th}$ image slice based on the segmentation mask of the $29^{th}$ image slice. Continuing with the above example, at a second occurrence of operation 520 (j=2), the 3D region segmentation system simulates positive and negative point selections in a $31^{st}$ image slice based on the segmentation mask of the $30^{th}$ image slice.

At operation 522, the 3D region segmentation system maps the $i+j^{th}$ image to an $i+j^{th}$ segmentation mask based on the simulated positive and negative point selections using the weakly supervised segmentation model. As an example, if i=14, at a first occurrence of operation 522 (j=1), the 3D region segmentation system maps the $15^{th}$ image slice to a $15^{th}$ segmentation mask based on the positive and negative point selections simulated at a operation 520, wherein $15^{th}$ indicates the image slice to which the segmentation mask corresponds, not that the segmentation mask is a $15^{th}$ produced segmentation mask.

At operation 524, the 3D region segmentation system determines if a stopping criterion is satisfied. In some embodiments, stopping criteria may include an area of an ROI in the $i+j^{th}$ segmentation mask being less than an ROI area threshold or the $i+j^{th}$ image slice being a last image slice in the image sequence in the second direction. If at operation 524 the 3D region segmentation system determines that a stopping criterion is not satisfied, method 500 may return to operation 518, where j may be incremented and a segmentation mask for the $i+j^{th}$ image slice determined as described above with reference to operations 518-524. However, if at operation 524 the 3D region segmentation system determines that a stopping criterion is satisfied, method 500 may proceed to operation 526.

At operation 526, the 3D region segmentation system renders the plurality of segmentation masks as a segmented 3D region via a display device. In some embodiments, at operation 526, the plurality of segmentation masks produced from both the first branch (i.e., operations 510-516) and the second branch (i.e., operations 518-524) of method 500, may be rendered as a segmented 3D region of interest. In some embodiments, the 3D region segmentation system may render the plurality of 2D segmentation masks as a segmented 3D region of interest by displaying each of the plurality of 2D segmentation masks in an order corresponding to the index of the image slice from which each 2D segmentation mask was generated. In some embodiments, the plurality of 2D segmentation masks may be displayed in with a pre-determined distance between adjacent 2D segmentation masks, and "stitched" together by interpolating a boundary of the ROI in the gap formed between adjacent 2D segmentation masks.

Following operation 526, method 500 may end. In this way, method 500 enables efficient propagation of annotation/segmentation from an initially user annotated image slice (the $i^{th}$ image slice), to extents of a 3D region of interest indicated by occurrence of one or more pre-determined stopping conditions. Further, method 500 enables parallel determination of 2D segmentation masks in both a first and second direction of propagation, thereby enabling rapid segmentation of 3D regions of interest from image sequences, in a computationally efficient manner. It will be understood, that although method 500 is described with reference to a first and second direction of propagation, method 500 may be extended to additional directions of propagation of weak supervisory inputs. As an example, for 3D image time series data (e.g., 3D videos), comprising a plurality of 2D image slices at a plurality of time-steps, method 500 may be extended to include two spatial directions of propagation (e.g., perpendicularly away from an initially annotated image), as well as in two temporal directions (e.g., away from a time-step of the initially annotated image). Further, although method 500 is described with reference to a first and second spatial direction of user annotation propagation, it will be appreciated that the method 500 may also be employed on 2D time series data (e.g., a 2D video), wherein the first and second spatial directions may be substituted for a first and second temporal direction (e.g., forward and backward relative to an initially annotated time-step).

Figure 6:
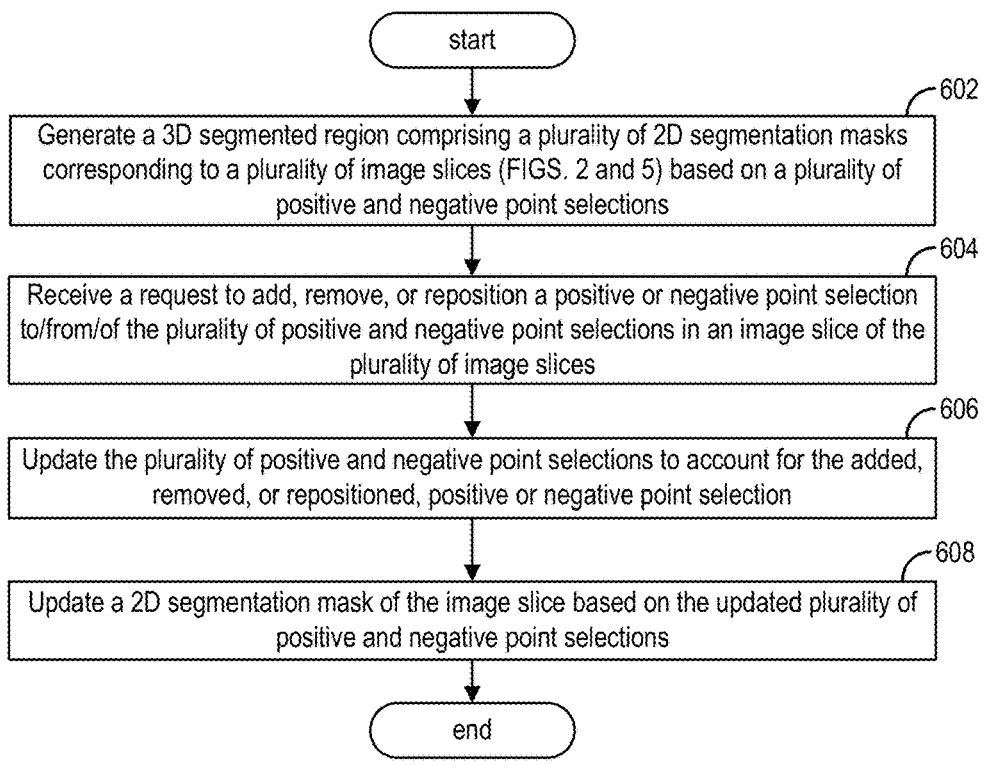
FIG. 6 shows a flowchart illustrating a first embodiment of a method for updating a 3D segmented region by adding or removing one or more positive or negative point selections from a plurality of positive and negative point selections, according to an embodiment of the disclosure.

Referring to FIG. 6, a first embodiment of a method 600 for adjusting a 3D segmented region, in real-time, based on a request to update one or more of the positive and/or negative points (used selected or simulated) is shown. Method 600 may be executed by a computing system, such as the 3D region segmentation system 100 shown in FIG. 1. Method 600 may be executed to enable dynamically updating a 3D segmented region to achieve an arbitrary level of segmentation accuracy.

Method 600 begins at operation 602, wherein the 3D region segmentation system generates a 3D segmented region comprising a plurality of 2D segmentation masks corresponding to a plurality of image slices based on a plurality of positive and negative point selections (see the description of FIGS. 2 and 5 for a more detailed description). In some embodiments, operation 602 may include execution of one or more operations of methods 200 and/or 500, wherein a 3D region is segmented from an image sequence, based on both user provided positive and negative point selections, as well as based on simulated positive and negative point selections. The combination of user provided and simulated positive and negative point selections is referred to as a plurality of positive and negative point selections, with reference to method 600. In some embodiments, the 3D region segmentation system may store the plurality of positive and negative point selections for a segmented 3D region in non-transitory memory, indexed based on an image slice to which each positive and negative point selection corresponds. In some embodiments, the plurality of positive and negative point selections may be visually displayed along with the rendered 3D region of interest, via a display device.

At operation 604, the 3D region segmentation system receives a request to add, remove, or reposition, a positive or negative point selection to/from/of the plurality of positive and negative point selections in an image slice of the plurality of image slices. In some embodiments, each of the plurality of positive and negative point selections may be displayed along with the plurality of image slices, and/or the plurality of 2D segmentation masks comprising the 3D segmented region generated at operation 602, wherein each of the displayed plurality of positive and negative point selections may comprise an interactive display element, enabling interaction via a user input device (e.g., to select, delete, reposition the corresponding positive or negative point selection). Further, a user input device may be used to add additional positive or negative point selections to the plurality of positive and negative point selections, e.g., by clicking on a point in one or more of the plurality of 2D images not currently occupied by a positive or negative point selection.

At operation 606, the 3D region segmentation system updates the plurality of positive and negative point selections based on the request received at operation 604. In some embodiments, a request to remove a positive or negative point selection from the plurality of positive and negative point selections may comprise an ID of the point to be removed, and operation 606 may include the 3D region segmentation system deleting a point corresponding to the ID, to produce an updated plurality of positive and negative point selections.

In some embodiments, a request to add a new positive or negative point selection to the plurality of positive and negative point selections may include coordinates of the new positive or negative point (e.g., coordinates both within a reference frame of the selected image, as well as an indication of the position of the image within the image sequence), as well as a label indicating whether the point to be added is a positive point selection or a negative point selection (e.g., the label may comprise a binary tag, wherein a label of 1 may correspond to a positive point selection and a label of 0 may correspond to a negative point selection). In such embodiments, operation 606 may include the 3D region segmentation system adding the new positive or negative point selection to the plurality of positive and negative point selections, based on the coordinates of the new point, and the label indicating whether the point is a positive or negative point selection, to produce an updated plurality of positive and negative point selections. The new point may be stored in non-transitory memory of the 3D region segmentation system, and may be indexed according to a position of the 2D image slice in which the new positive or negative point selection was added (e.g., for a new positive point selection added to a $12^{th}$ image slice, an index of 12 may be used to store the new positive point selection, thereby facility rapid lookup of the point).

In some embodiments, a request to reposition a positive or negative point of the plurality of positive and negative points may include an ID of the selected point, and coordinates of the new selected location for the point. In such embodiments, operation 606 includes the 3D region segmentation system querying an entry of the selected point based on the ID, wherein the entry includes previous coordinates of the point, and over-writing the previous coordinates of the point with the newly selected coordinates, to produce an updated entry for the point.

At operation 608, the 3D region segmentation system may update a 2D segmentation mask of the image slice (i.e., the image slice corresponding to the added, removed, or repositioned point selection) based on the updated plurality of positive and negative point selections. The 3D region segmentation system may query positive and negative point selections for the image slice by searching through non-transitory memory for positive and negative point selections indexed according to image slice position. In response to retrieving positive and negative point selections for the image slice, the 3D region segmentation system may generate an updated 2D segmentation mask for the image slice, by feeding the retrieved positive and negative point selections, along with the 2D image slice, to a weakly supervised segmentation model, as described in more detail with reference to operations 206, 210, and 214 of method 200, and operations 506, 514, and 522, of method 500, as well as in FIGS. 10 and 11. The 3D region segmentation system may then overwrite the previous 2D segmentation mask of the image slice, with the updated 2D segmentation mask.

Following operation 608, method 600 may end. In this way, method 600 enables rapid refinement of a 3D segmented region by adding, removing, and/or repositioning positive and/or negative point selections. This advantageously enables real-time refinement of a 3D segmented region, which may over, or under segment, an ROI in various image slices of an image sequence, by adjusting the 2D segmentation masks for only those slices with over or under segmentation. In other words, as compared to method 700, method 600 performs updates to an image slice for which a request to add, remove, or reposition a point selection is received, but does not update 2D segmentation masks or positive/negative point selections in images other than that for which the request was received.

Figure 7:
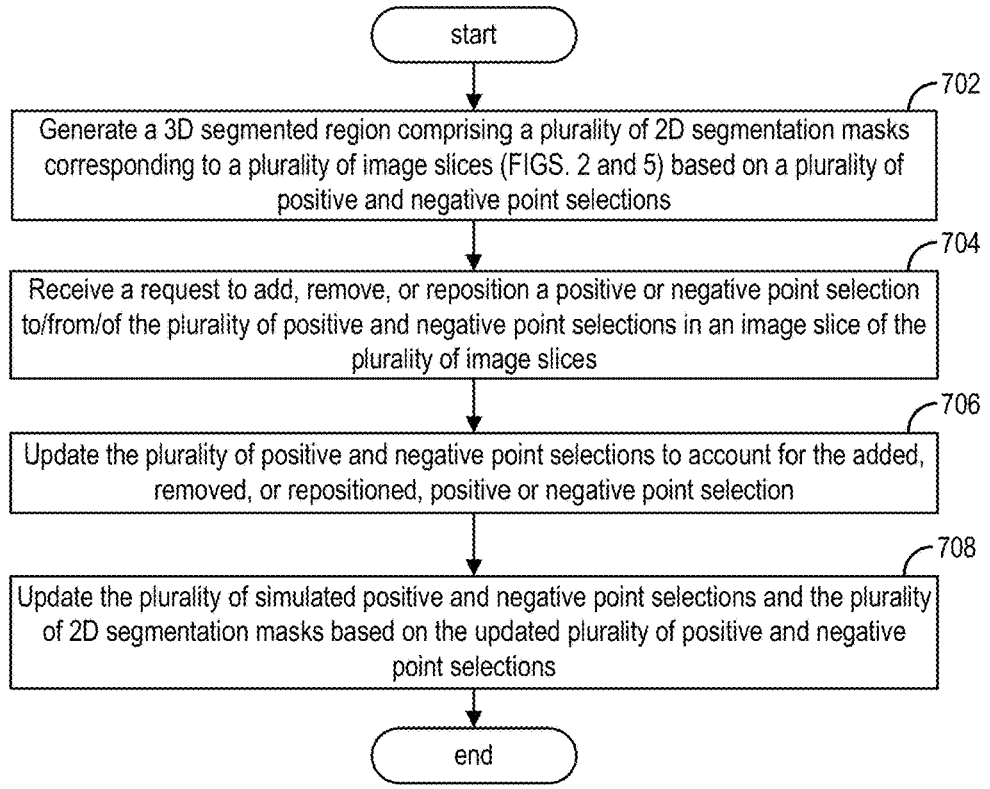
FIG. 7 shows a flowchart illustrating a second embodiment of a method for updating a 3D segmented region by adding or removing one or more positive or negative point selections from a plurality of positive and negative point selections, according to an embodiment of the disclosure.
Figure 8C:
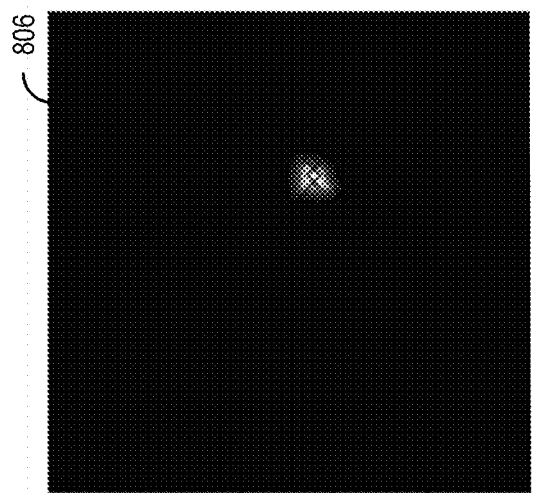
FIGS. 8A-8C show an exemplary embodiment of a 2D segmentation mask, and a corresponding positive point selection probability map and negative point selection probability map, according to an embodiment of the disclosure.
Figure 8B:
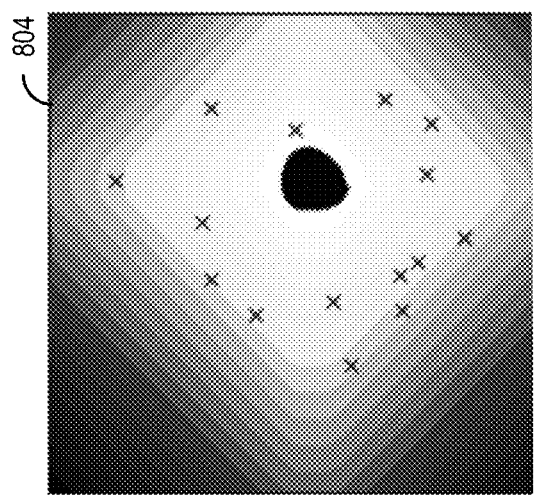
Figure 8A:
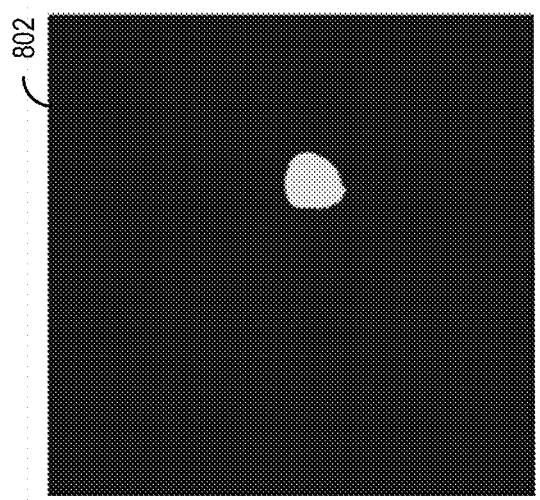

Referring to FIG. 7, a second embodiment of a method 700 for adjusting a 3D segmented region, in real-time, based on a request to update one or more of the positive and/or negative points (used selected or simulated) is shown. Method 700 may be executed by a computing system, such as the 3D region segmentation system 100 shown in FIG. 1. Method 700 may be executed to enable dynamically updating a 3D segmented region to achieve an arbitrary level of segmentation accuracy.

Method 700 begins at operation 702, wherein the 3D region segmentation system generates a 3D segmented region comprising a plurality of 2D segmentation masks corresponding to a plurality of image slices based on a plurality of positive and negative point selections (see the description of FIGS. 2 and 5 for a more detailed description). In some embodiments, operation 702 may include execution of one or more operations of methods 200 and/or 500, wherein a 3D region is segmented from an image sequence, based on both user provided positive and negative point selections, as well as based on simulated positive and negative point selections. The combination of user provided and simulated positive and negative point selections is referred to as a plurality of positive and negative point selections, with reference to method 700. In some embodiments, the 3D region segmentation system may store the plurality of positive and negative point selections for a segmented 3D region in non-transitory memory, indexed based on an image slice to which each positive and negative point selection corresponds. In some embodiments, the plurality of positive and negative point selections may be visually displayed along with the rendered 3D region of interest, via a display device.

At operation 704, the 3D region segmentation system receives a request to add, remove, or reposition, a positive or negative point selection to/from/of the plurality of positive and negative point selections in an image slice of the plurality of image slices. In some embodiments, each of the plurality of positive and negative point selections may be displayed along with the plurality of image slices, and/or the plurality of 2D segmentation masks comprising the 3D segmented region generated at operation 702, wherein each of the displayed plurality of positive and negative point selections may comprise an interactive display element, enabling interaction via a user input device (e.g., to select, delete, reposition the corresponding positive or negative point selection). Further, a user input device may be used to add additional positive or negative point selections to the plurality of positive and negative point selections, e.g., by clicking on a point in one or more of the plurality of 2D images not currently occupied by a positive or negative point selection.

At operation 706, the 3D region segmentation system updates the plurality of positive and negative point selections based on the request received at operation 704. In some embodiments, a request to remove a positive or negative point selection from the plurality of positive and negative point selections may comprise an ID of the point to be removed, and operation 706 may include the 3D region segmentation system deleting a point corresponding to the ID, to produce an updated plurality of positive and negative point selections.

In some embodiments, a request to add a new positive or negative point selection to the plurality of positive and negative point selections may include coordinates of the new positive or negative point (e.g., coordinates both within a reference frame of the selected image, as well as an indication of the position of the image within the image sequence), as well as a label indicating whether the point to be added is a positive point selection or a negative point selection (e.g., the label may comprise a binary tag, wherein a label of 1 may correspond to a positive point selection and a label of 0 may correspond to a negative point selection). In such embodiments, operation 706 may include the 3D region segmentation system adding the new positive or negative point selection to the plurality of positive and negative point selections, based on the coordinates of the new point, and the label indicating whether the point is a positive or negative point selection, to produce an updated plurality of positive and negative point selections. The new point may be stored in non-transitory memory of the 3D region segmentation system, and may be indexed according to a position of the 2D image slice in which the new positive or negative point selection was added (e.g., for a new positive point selection added to a $12^{th}$ image slice, an index of 12 may be used to store the new positive point selection, thereby facility rapid lookup of the point).

In some embodiments, a request to reposition a positive or negative point of the plurality of positive and negative points may include an ID of the selected point, and coordinates of the new selected location for the point. In such embodiments, operation 706 includes the 3D region segmentation system querying an entry of the selected point based on the ID, wherein the entry includes previous coordinates of the point, and over-writing the previous coordinates of the point with the newly selected coordinates, to produce an updated entry for the point.

At operation 708, the 3D region segmentation system updates the plurality of simulated positive and negative point selections and the plurality of 2D segmentation masks based on the updated plurality of positive and negative point selections. The 3D region segmentation system may query positive and negative point selections for the image slice by searching through non-transitory memory for positive and negative point selections indexed according to image slice position. In response to retrieving positive and negative point selections for the image slice, the 3D region segmentation system may generate an updated 2D segmentation mask for the image slice, by feeding the retrieved positive and negative point selections, along with the 2D image slice, to a weakly supervised segmentation model, as described in more detail with reference to operations 206, 210, and 214 of method 200, and operations 506, 514, and 522, of method 500, as well as in FIGS. 10 and 11. The 3D region segmentation system may then overwrite the previous 2D segmentation mask of the image slice, with the updated 2D segmentation mask.

Following updating of the 2D segmentation mask of the image slice, hereafter referred to as a first image slice, the 3D region segmentation system proceeds to update the 2D segmentation masks of adjacent image slices, by simulating new positive and negative point selections in the adjacent image slices based on the updated segmentation mask for the first slice. The 3D region segmentation system may proceed in a manner similar to that described in method 500, wherein image slices in both a first and second direction of propagation are segmented, through an iterative process of positive/negative point simulation, followed by weakly supervised segmentation. Thus, previously simulated positive and negative points, in slices other than the first image slice, may be overwritten at operation 708, as new "weak supervision" in the form of the added, removed, or repositioned positive/negative point selection in the first image slice propagates throughout the remainder of the image sequence. Positive and negative point selections made based on input received via a user device, that is, positive and negative point selections which were not simulated (i.e., non-simulated points), but which were generated based on input received from a user, may not be overwritten at operation 708. In other words, during simulation of positive and negative point selections in image slices other than the first image slice, non-simulated positive and negative points may not be overwritten, whereas simulated points may be overwritten and replaced with newly simulated positive and negative point selections. Image slices, along with corresponding non-simulated positive and negative point selections, and the newly simulated positive and negative point selections, may be fed to the weakly supervised segmentation model, to produce updated 2D segmentation masks.

Following operation 708, method 700 may end. In this way, method 700 enables rapid refinement of a 3D segmented region by adding, removing, and/or repositioning positive and/or negative point selections, wherein this newly added "weak supervision" is then propagated to simulated positive and negative point selections and segmentation masks in other image slices. This advantageously enables real-time, holistic refinement of a 3D segmented region, by extending the newly acquired "weak supervision" in a first image slice, to a remainder of the image slices in the image sequence. In other words, as compared to method 600, method 700 performs updates to both the first image slice, for which a request to add, remove, or reposition a point selection is received, as well as additional image slices other than the first image slice.

Referring to FIGS. 8A, 8B, and 8C, a segmentation mask 802 for an ROI in a previous image slice, a negative point selection probability map 804, and a positive point selection probability map 806, are shown. The negative point selection probability map 804 and the positive point selection probability map 806, may be generated based on the segmentation mask 802, according to one or more operations of methods 300 and 400, discussed above. The negative point selection probability map 804 and the positive point selection probability map 806 are rendered graphically as heat maps, wherein a probability value of a point corresponds to a pixel intensity value in the heat maps.

Figure 10:
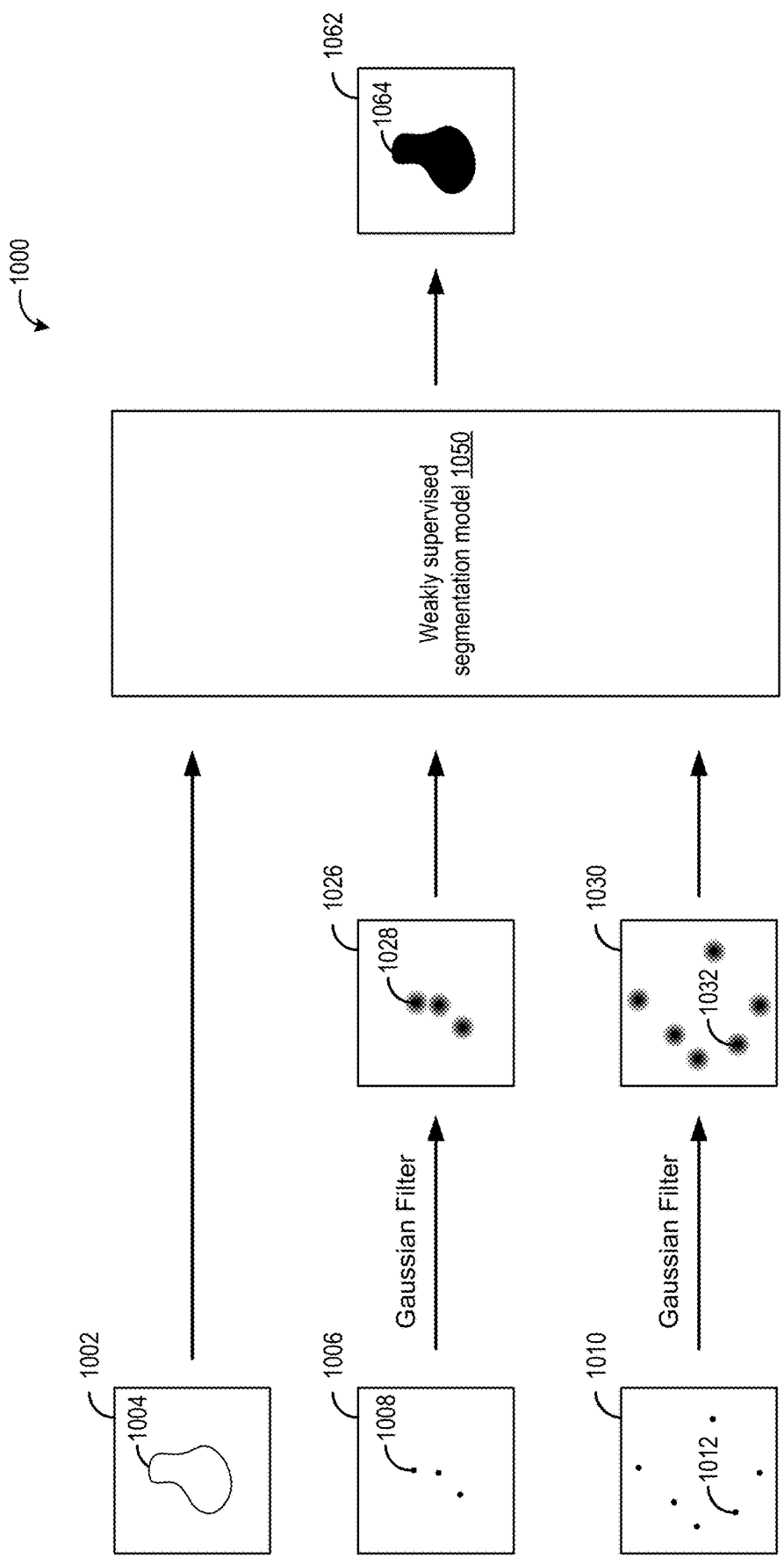
FIG. 10 shows a block diagram illustrating mapping of a 2D image slice, and positive and/or negative point selections, to a 2D segmentation mask, using a weakly supervised segmentation model, according to an embodiment of the disclosure.

Referring to FIG. 10, a block diagram 1000 illustrating an exemplary embodiment of a weakly supervised segmentation model 1050, is shown. The weakly supervised segmentation model 1050 is configured to map 2D images, such as 2D image 1002, and corresponding positive and/or negative point selections, such as positive point selection mask 1006 and negative point selection mask 1010, to a segmentation mask of an ROI, such as segmentation mask 1062. Block diagram 1000 illustrates an exemplary process by which a weakly supervised segmentation model may map 2D images and positive/negative point selections to 2D segmentation masks, such as may occur at operations 206, 210, and 214 of method 200, and at operations 506, 514, and 522 of method 500, however, it will be appreciated that alternative processes of mapping 2D images to segmentation masks using weak supervisory inputs in the form of positive and/or negative point selections may be used.

Input to the weakly supervised segmentation model 1050 includes a 2D image 1002, capturing a region of interest (ROI) 1004. The 2D image may comprise a 2D image slice from an image sequence, or a frame of a 2D video. In some embodiments, 2D image 1002 is a medical image, which may include a computed tomography image (CT), a magnetic resonance (MR) image, a positron emission tomography (PET) image, or an image in other modalities of medical imaging known in the art. The ROI 1004 may, in some embodiments, include an anatomical structure, such as an organ, a tumor, or may comprise a medical device, such as a surgical implant. In some embodiments, image 1002 may not include an ROI. A size of image 1002 may be pre-determined, and will herein be referred to as W×H, wherein W refers to a width of 2D image 1002, and H refers to a height of 2D image 1002, as measured in pixels.

Input to the weakly supervised segmentation model 1050 further includes a positive point selection mask 1006, and negative point selection mask 1010, which may be produced from zero or more positive point selections, and zero or more negative point selections, respectively.

In some embodiments, the positive point selection mask 1006 comprises an array or grid of values, corresponding to pixels of 2D image 1002, wherein a size of the positive point selection mask 1006 may be equal to the size of the 2D image 1002, that is, may comprise a W×H gride of values, wherein positions in the grid corresponding to positive point selections may be set to a first value (e.g., an integer value of 1), and positions in the grid corresponding to non-positive point selections may be set to a second value (e.g., an integer value of 0). The positive point selection mask 1006 shown in FIG. 10, includes three positive point selections 1008, indicated by three black dots, which correspond to points or pixels in 2D image 1002 labeled as belonging to ROI 1004 (e.g., are set to a value of 1). The white portions of positive point selection mask 1006 represent non-positive point selections (e.g., are set to a value of zero).

Similarly, in some embodiments, the negative point selection mask 1010 comprises an array or grid of values, corresponding to pixels of 2D image 1002, wherein a size of the negative point selection mask 1010 may be equal to the size of the 2D image 1002, that is, may comprise a W×H gride of values, wherein positions in the grid corresponding to negative point selections may be set to a first value (e.g., an integer value of 1), and positions in the grid corresponding to non-negative point selections may be set to a second value (e.g., an integer value of 0). The negative point selection mask 1010 shown in FIG. 10, includes six negative point selections 1012, indicated by six black dots, which correspond to points or pixels in 2D image 1002 labeled as belonging to non-ROI regions (e.g., are set to a value of 1). The white portions of negative point selection mask 1010 represent non-negative point selections (e.g., are set to a value of zero).

The positive point selection mask 1006 and the negative point selection mask 1010 may be produced by plotting positive and negative point selections, respectively, within grids of size equal to the 2D image in which the positive and negative point selections were made (i.e., W×H), wherein "plotting" refers to setting a position in the grid to a pre-determined value, indicating the position corresponds to either ROI (for positive point selections) or non-ROI (for negative point selections). The positive point selection mask 1006, and the negative point selection mask 1010, may be pre-processed, by applying a Gaussian filter to smooth/blur the positive and negative point selections. The resulting masks may be referred to herein as a smoothed positive point selection mask 1026, and a smoothed negative point selection mask 1030. Although a gaussian filter is used in FIG. 10, it will be appreciated that other smoothing filters known in the art of image processing may be used. As can be seen, by applying the Gaussian filter, input signal in the form of the positive point selections 1008 "diffuse" to surrounding regions of the grid, producing smoothed positive point selections 1028. Similarly, by applying the Gaussian filter, input signal in the form of the negative point selections 1012 "diffuse" to surrounding regions of the grid, producing smoothed negative point selections 1032.

In some embodiments, a normalization of the values in the smoothed positive point selection mask 1026 and the smoothed negative point selection mask 1030 to a range of [0, 1] may be performed. As an example, normalization may include, for each value in either the smoothed positive point selection mask 1026 or the smoothed negative point selection mask 1030, subtracting a smallest value in the respective grid, and dividing by the range of values in the grid (i.e., the largest value minus the smallest value). The normalized and smoothed positive point selection mask 1026 and the normalized and smoothed negative point selection mask 1030, are then concatenated with the 2D image 1002, thereby adding two additional layers, or channels, to 2D image 1002, which provide weak supervisory signal to the weakly supervised segmentation model 1050. In other words, the normalized and smoothed positive point selection mask 1026, and the normalized and smoothed negative point selection mask 1030, may be concatenated with the 2D image 1002 in a manner similar to an additional color channel, wherein each pixel of 2D image 1002 includes one channel per color (indicating a color intensity of that pixel in the respective color of the channel).

The concatenated input may then be fed to the weakly supervised segmentation model 1050, and mapped to a segmentation mask 1062 for the ROI 1004. In some embodiments, the weakly supervised segmentation model 1050 comprises a fully convolutional neural network (FCNN). In some embodiments, the weakly supervised segmentation model 1050 may comprise an encoder-decoder architecture, wherein a spatial resolution of feature maps decreases in a down-sampling path, until a bottleneck is reached, and subsequently the spatial resolution of the feature maps is increased along an up-sampling path, until an output of a same spatial resolution as 2D image 1002 is obtained. In some embodiments, the weakly supervised segmentation model 1050 may comprise a U-net based architecture, wherein a number of feature channels in an initial layer is adjusted to account for the weak supervisory input layers.

The weakly supervised segmentation model 1050 may receive the concatenated input, and apply one or more learned convolutional kernels, configured to map input data in the form of color intensity (in one or more channels) and weak supervisory inputs (in the form of positive and negative point selection masks), to feature maps. The feature maps may in turn be filtered by additional learned convolutional kernels, until a final layer is reached, wherein a feature map is mapped to the segmentation mask 1062. The segmentation mask 1062 includes a segmented region of interest 1064, indicated by the black region within segmentation mask 1062. In some embodiments, the segmentation mask 1062 may comprise a grid of size W×H, wherein points of the grid labeled with a first value (e.g., 1) correspond to pixels in 2D image 1002 classified by the weakly supervised segmentation model 1050 as belonging to ROI 1004, and points of the grid labeled with a second value (e.g., 0), correspond to pixels in the 2D image 1002 classified by the weakly supervised segmentation model as belonging to non-ROI.

Figure 11:
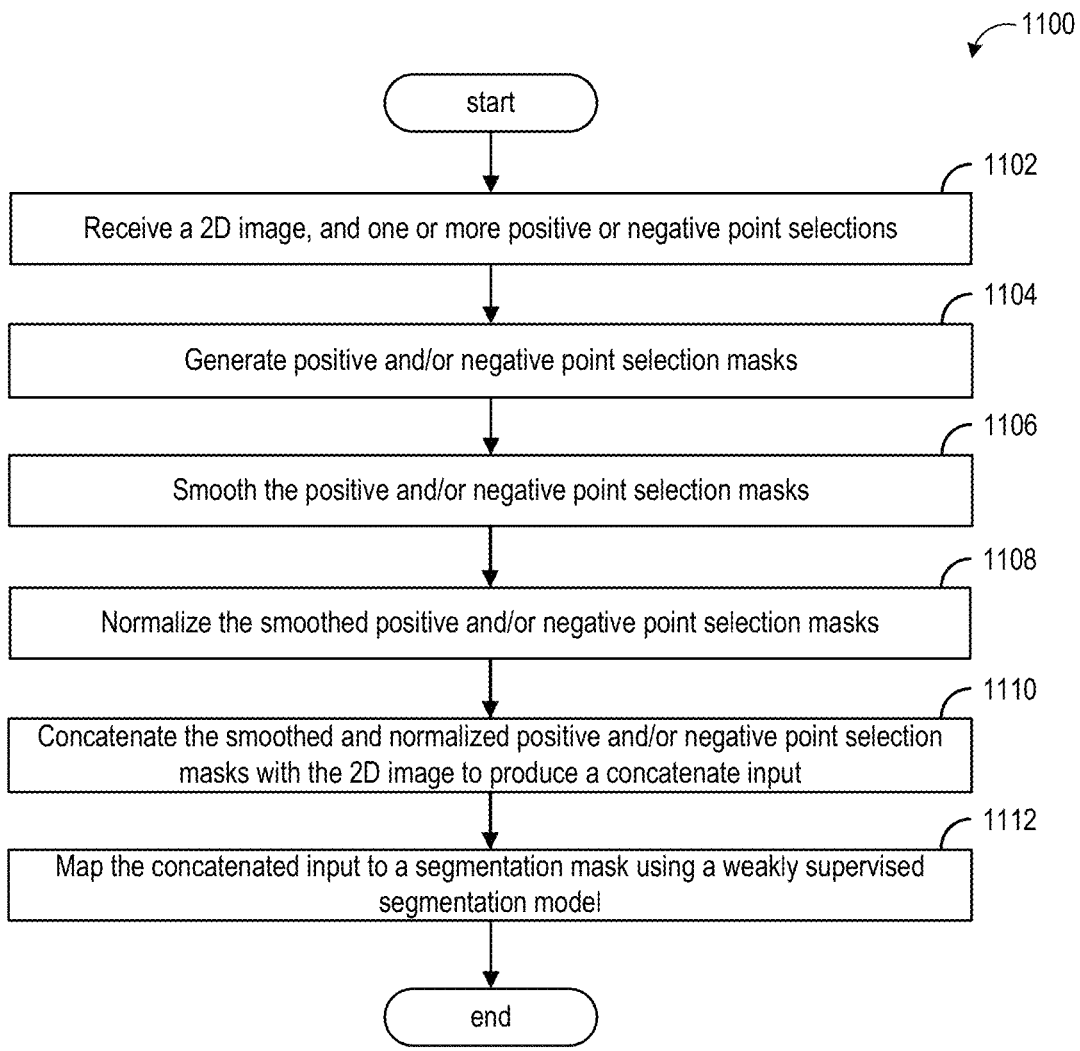
FIG. 11 shows a flowchart illustrating a method for mapping a 2D image slice, and positive and/or negative point selections, to a 2D segmentation mask, according to an embodiment of the disclosure.

Referring to FIG. 11, an embodiment of a method 1100 for mapping 2D images to segmentation masks based on positive and/or negative point selections, is shown. Method 1100 may be executed by a computing system, such as the 3D region segmentation system 100 shown in FIG. 1. Method 1100 illustrates one embodiment by which weak supervisory inputs in the form positive and negative point selections may be used by a machine learning model to inform prediction of a 2D segmentation mask, for a corresponding 2D image, such as may occur at operations 206, 210, and 214 of method 200, and at operations 506, 514, and 522 of method 500. It will be appreciated that alternative processes of mapping 2D images to segmentation masks using weak supervisory inputs in the form of positive and/or negative point selections may be used.

Method 1100 begins at operation 1102, wherein the 3D region segmentation system receives a 2D image, and one or more positive or negative point selections. The 2D image may comprise a 2D image slice from an image sequence, or a frame of a 2D video. In some embodiments, the 2D image is a medical image, which may include a computed tomography image (CT), a magnetic resonance (MR) image, a positron emission tomography (PET) image, or an image in other modalities of medical imaging known in the art. The image may include an ROI such as an anatomical structure, (e.g., an organ, a tumor, etc.), or may comprise a medical device (e.g., a surgical implant). In some embodiments, the 2D image may not include an ROI. A size of the 2D image may be pre-determined, and will herein be referred to as W×H, wherein W refers to a width of 2D image, and H refers to a height of 2D image, as measured in pixels.

The positive and/or negative point selections may comprise coordinates for a location within a reference frame (e.g., pixel map) of the 2D image, and a label indicating if the coordinates correspond to a positive point selection or a negative point selection. In some embodiments, the positive point selections and the negative point selections may be stored in a first data structure, and a second data structure, respectively. In such embodiments, the positive/negative point selections may not include a label, as the data structure in which the point is stored implicitly indicates whether the point is a negative point selection or a positive point selection.

At operation 1104, the 3D region segmentation system generates positive and negative point selection masks. The positive point selection mask and the negative point selection mask may be produced by plotting positive and negative point selections, respectively, within grids of size equal to the 2D image in which the positive and negative point selections were made (i.e., W×H), wherein "plotting" refers to setting a position in the grid to a pre-determined value, indicating the position corresponds to either ROI (for positive point selections) or non-ROI (for negative point selections). As each positive and/or negative point selection includes coordinates of said point within the 2D image reference frame, operation 1104 may include accessing the coordinates of each positive and negative point selection, and plotting the point selection in at a corresponding location of a corresponding mask (e.g., plotting negative point selections in a negative point selection mask, and plotting positive point selections in a positive point selection mask).

In some embodiments, the positive point selection mask comprises an array or grid of values, corresponding to pixels of the 2D image, wherein a size of the positive point selection mask may be equal to the size of the 2D image, that is, may comprise a W×H gride of values, wherein positions in the grid corresponding to positive point selections may be set to a first value (e.g., an integer value of 1), and positions in the grid corresponding to non-positive point selections may be set to a second value (e.g., an integer value of 0). Similarly, in some embodiments, the negative point selection mask comprises an array or grid of values, corresponding to pixels of 2D image, wherein a size of the negative point selection mask may be equal to the size of the 2D image, that is, may comprise a W×H gride of values, wherein positions in the grid corresponding to negative point selections may be set to a first value (e.g., an integer value of 1), and positions in the grid corresponding to non-negative point selections may be set to a second value (e.g., an integer value of 0).

At operation 1106, the 3D region segmentation system smooths the positive and/or negative point selection masks. The positive point selection mask, and the negative point selection mask, may smoothed by applying a Gaussian filter to smooth/blur the positive and negative point selections. The resulting masks may be referred to herein as a smoothed positive point selection mask, and a smoothed negative point selection mask. Although a gaussian filter is described, it will be appreciated that other smoothing filters known in the art of image processing may be used. By smoothing the positive and negative point selections, weak supervisory information is "diffused" into surrounding regions.

At operation 1108, the 3D region segmentation system normalizes the smoothed positive and/or negative point selection masks. In some embodiments, a normalization of the values in the smoothed positive point selection mask and the smoothed negative point selection mask to a range of [0, 1] may be performed. As an example, normalization may include, for each value in either the smoothed positive point selection mask or the smoothed negative point selection mask, subtracting a smallest value in the respective grid, and dividing by the range of values in the grid (i.e., the largest value minus the smallest value).

At operation 1110, the 3D region segmentation system concatenates the smoothed and normalized positive and/or negative point selection masks with the 2D image to produce a concatenate input. The normalized and smoothed positive point selection mask and the normalized and smoothed negative point selection mask, are concatenated with the 2D image, thereby adding two additional layers, or channels, to the 2D image, which provide weak supervisory signal to the weakly supervised segmentation model. In other words, the normalized and smoothed positive point selection mask, and the normalized and smoothed negative point selection mask, may be concatenated with the 2D image in a manner similar to an additional color channel, wherein each pixel of 2D image includes one channel per color (indicating a color intensity of that pixel in the respective color of the channel).

At operation 1112, the 3D region segmentation system maps the concatenated input to a segmentation mask using a weakly supervised segmentation model. In some embodiments, the weakly supervised segmentation model comprises a fully convolutional neural network (FCNN). In some embodiments, the weakly supervised segmentation model may comprise an encoder-decoder architecture, wherein a spatial resolution of feature maps decreases in a down-sampling path, until a bottleneck is reached, and subsequently the spatial resolution of the feature maps is increased along an up-sampling path, until an output of a same spatial resolution as 2D image is obtained. In some embodiments, the weakly supervised segmentation model may comprise a U-net based architecture, wherein a number of feature channels in an initial layer is adjusted to account for the weak supervisory input layers.

The weakly supervised segmentation model may receive the concatenated input, and apply one or more learned convolutional kernels, configured to map input data in the form of color intensity (in one or more channels) and weak supervisory inputs (in the form of positive and negative point selection masks), to feature maps. The feature maps may in turn be filtered by additional learned convolutional kernels, until a final layer is reached, wherein a feature map is mapped to the segmentation mask. The segmentation mask may include a segmented region of interest. In some embodiments, the segmentation mask may comprise a grid of size W×H, wherein points of the grid labeled with a first value (e.g., 1) correspond to pixels in the 2D image classified by the weakly supervised segmentation model as belonging to ROI, and points of the grid labeled with a second value (e.g., 0), correspond to pixels in the 2D image classified by the weakly supervised segmentation model as belonging to non-ROI.

Following operation 1112, method 1100 may end. In this way, method 1100 enables weak supervisory inputs, in the form of positive and/or negative point selections, to be efficiently integrated with 2D images, and fed as input into a machine learning model, such as a FCNN.

The disclosure also provides support for a method comprising: receiving at least one positive point selection or negative point selection for a region of interest in a first image slice of an image sequence, mapping the first image slice and the at least one positive point selection or negative point selection to a first segmentation mask of the region of interest using a weakly supervised segmentation model, simulating positive and negative point selections in a second image slice based on the first segmentation mask to produce a plurality of simulated positive and negative point selections, wherein the second image slice is adjacent to the first image slice in the image sequence, and mapping the second image slice and the plurality of simulated positive and negative point selections to a second segmentation mask for the region of interest in the second image slice using the weakly supervised segmentation model. In a first example of the method the method further comprising: rendering the first segmentation mask and the second segmentation mask as a three-dimensional (3D) region, and displaying the 3D region via a display device. In a second example of the method, optionally including the first example the method further comprising: simulating positive and negative point selections in a third image slice based on the second segmentation mask to produce a second plurality of simulated positive and negative point selections, wherein the third image slice is adjacent to the second image slice in the image sequence, and mapping the third image slice and the second plurality of simulated positive and negative point selections to a third segmentation mask for the region of interest in the third image slice using the weakly supervised segmentation model. In a third example of the method, optionally including one or both of the first and second examples, simulating positive and negative point selections in the second image slice based on the first segmentation mask comprises: generating a probability map for negative point selections based on the first segmentation mask, and generating a pre-determined number of negative point selections within a region of the second image slice, wherein the region corresponds to a set of locations of the probability map having above a first threshold probability of negative point selection, and below a second threshold probability of negative point selection. In a fourth example of the method, optionally including one or more or each of the first through third examples, generating the probability map for negative point selections based on the first segmentation mask comprises: increasing a probability of negative point selection as a distance from a closest point of the region of interest in the first segmentation mask increases, and setting a probability of negative point selection to zero within the region of interest. In a fifth example of the method, optionally including one or more or each of the first through fourth examples, simulating positive and negative point selections in the second image slice based on the first segmentation mask comprises: generating a probability map for positive point selections based on the first segmentation mask, and generating a pre-determined number of positive point selections within a region of the second image slice, wherein the region corresponds to a set of locations of the probability map having above a first threshold probability of positive point selection, and below a second threshold probability of negative point selection. In a sixth example of the method, optionally including one or more or each of the first through fifth examples, generating the probability map for positive point selections based on the first segmentation mask comprises: increasing a probability of positive point selection as a distance from a closest point outside of the region of interest increases, and setting a probability of positive point selection to zero outside of the region of interest. In a seventh example of the method, optionally including one or more or each of the first through sixth examples the method further comprising: receiving a request to remove one or more of the plurality of simulated positive and negative point selections in the second image slice, responding to the request by removing one or more of the plurality of simulated positive and negative point selections from the second image slice to produce an updated plurality of simulated positive and negative point selections, mapping the second image slice and the updated plurality of simulated positive and negative point selections to an updated second segmentation mask using the weakly supervised segmentation model, and replacing the second segmentation mask with the updated second segmentation mask. In a eighth example of the method, optionally including one or more or each of the first through seventh examples the method further comprising: receiving a request to add one or more positive or negative point selections to the plurality of simulated positive and negative point selections in the second image slice, responding to the request by adding the one or more positive or negative point selections to the plurality of simulated positive and negative point selections to produce an updated plurality of positive and negative point selections in the second image slice, mapping the second image slice and the updated plurality of positive and negative point selections to an updated second segmentation mask using the weakly supervised segmentation model, and replacing the second segmentation mask with the updated second segmentation mask.

The disclosure also provides support for a method of producing a segmented three-dimensional (3D) region of interest (ROI) from an image sequence, comprising: selecting an $i^{th}$ image slice from the image sequence, wherein i indicates a position within the image sequence, receiving a positive or negative point selection for the ROI in the $i^{th}$ image slice, mapping the $i^{th}$ image slice to an $i^{th}$ segmentation mask based on the positive or negative point selection, using a weakly supervised segmentation model, generating a first plurality of simulated positive and negative point selections in an $i+1^{th}$ image slice and a second plurality of simulated positive and negative point selections in an $i-1^{th}$ image slice, based on the $i^{th}$ segmentation mask, mapping the $i+1^{th}$ image slice to an $i+1^{th}$ segmentation mask based on the first plurality of simulated positive and negative point selections, using the weakly supervised segmentation model, mapping the $i-1^{th}$ image slice to an $i-1^{th}$ segmentation mask based on the second plurality of simulated positive and negative point selections, using the weakly supervised segmentation model, rendering the $i^{th}$ segmentation mask, the $i+1^{th}$ segmentation mask, and the $i-1^{th}$ segmentation mask as the segmented 3D ROI, and displaying the segmented 3D ROI via a display device. In a first example of the method, rendering the $i^{th}$ segmentation mask, the $i+1^{th}$ segmentation mask, and the $i-1^{th}$ segmentation mask as the segmented 3D ROI includes: superimposing the segmented 3D ROI over the image sequence, and displaying the positive or negative point selection for the ROI in the $i^{th}$ image slice, along with the first plurality of simulated positive and negative point selections in the $i+1^{th}$ image slice, and the second plurality of simulated positive and negative point selections in the $i-1^{th}$ image slice. In a second example of the method, optionally including the first example, generating the first plurality of simulated positive and negative point selections in the $i+1^{th}$ image slice and the second plurality of simulated positive and negative point selections in the $i-1^{th}$ image slice, based on the $i^{th}$ segmentation mask comprises: generating a probability map for positive and negative point selections based on the $i^{th}$ segmentation mask, and placing a first pre-determined number of positive point selections in each of the $i+1^{th}$ image slice and the $i-1^{th}$ image slice based on the probability map, and placing a second pre-determined number of negative point selections in each of the $i+1^{th}$ image slice and the $i-1^{th}$ image slice based on the probability map. In a third example of the method, optionally including one or both of the first and second examples, generating a probability map for positive and negative point selections based on the $i^{th}$ segmentation mask comprises: determining a probability of negative point selection based on a distance from the ROI in the $i^{th}$ segmentation mask, wherein a probability of negative point selection is set to zero within the ROI, and wherein the probability of negative point selection increases as a distance from the ROI increases. In a fourth example of the method, optionally including one or more or each of the first through third examples, generating a probability map for positive and negative point selections based on the $i^{th}$ segmentation mask comprises: determining a probability of positive point selection based on a distance from non-ROI regions in the $i^{th}$ segmentation mask, wherein a probability of positive point selection is set to zero in non-ROI regions, and wherein the probability of positive point selection increases as a distance from non-ROI regions in the $i^{th}$ segmentation mask increases.

The disclosure also provides support for a three-dimensional (3D) region segmentation system comprising: a user input device, a display device, a non-transitory memory storing a weakly supervised segmentation model, and instructions, and a processor communicatively coupled to the user input device, the display device, and the non-transitory memory, wherein, when executing the instructions, the processor is configured to: receive via the user input device a positive point selection or negative point selection for a region of interest (ROI) in a first image slice of an image sequence, map the first image slice and the positive point selection or negative point selection to a first segmentation mask of the ROI using the weakly supervised segmentation model, simulate positive and negative point selections in a second image slice based on the first segmentation mask to produce a plurality of simulated positive and negative point selections, wherein the second image slice is adjacent to the first image slice in the image sequence, map the second image slice and the plurality of simulated positive and negative point selections to a second segmentation mask for the ROI in the second image slice using the weakly supervised segmentation model, render the first segmentation mask and the second segmentation mask as a 3D region, and display the 3D region via the display device. In a first example of the system, the processor is configured to simulate positive and negative point selections in the second image slice based on the first segmentation mask by: generating a probability map for negative point selections based on the first segmentation mask, and placing a pre-determined number of negative point selections within a region of the second image slice, wherein the region corresponds to a set of locations of the probability map having above a first threshold probability of negative point selection, and below a second threshold probability of negative point selection. In a second example of the system, optionally including the first example, the processor is configured to simulate positive and negative point selections in the second image slice based on the first segmentation mask by: generating a probability map for positive point selections based on the first segmentation mask, and placing a pre-determined number of positive point selections within a region of the second image slice, wherein the region corresponds to a set of locations of the probability map having above a first threshold probability of positive point selection, and below a second threshold probability of negative point selection. In a third example of the system, optionally including one or both of the first and second examples when executing the instructions, the processor is further configured to: evaluate if the second image slice and second segmentation mask satisfy one or more stopping criterion, and respond to the second image slice and the second segmentation mask not satisfying the one or more stopping criterion by: simulating positive and negative point selections in a third image slice based on the second segmentation mask to produce a second plurality of simulated positive and negative point selections, wherein the third image slice is adjacent to the second image slice in the image sequence, and mapping the third image slice and the second plurality of simulated positive and negative point selections to a third segmentation mask for the ROI in the third image slice using the weakly supervised segmentation model. In a fourth example of the system, optionally including one or more or each of the first through third examples, the one or more stopping criterion includes an area of the second segmentation mask being below a segmentation mask area threshold. In a fifth example of the system, optionally including one or more or each of the first through fourth examples when executing the instructions, the processor is further configured to: evaluate if the second image slice and second segmentation mask satisfy one or more stopping criterion, and respond to the second image slice and the second segmentation mask satisfying the one or more stopping criterion by: ceasing segmentation of the ROI in a direction of propagation of the second image slice.

As used herein, an element or step recited in the singular and proceeded with the word "a" or "an" should be understood as not excluding plural of said elements or steps, unless such exclusion is explicitly stated. Furthermore, references to "one embodiment" of the present invention are not intended to be interpreted as excluding the existence of additional embodiments that also incorporate the recited features. Moreover, unless explicitly stated to the contrary, embodiments "comprising," "including," or "having" an element or a plurality of elements having a particular property may include additional such elements not having that property. The terms "including" and "in which" are used as the plain-language equivalents of the respective terms "comprising" and "wherein." Moreover, the terms "first," "second," and "third," etc. are used merely as labels, and are not intended to impose numerical requirements or a particular positional order on their objects.

This written description uses examples to disclose the invention, including the best mode, and also to enable a person of ordinary skill in the relevant art to practice the invention, including making and using any devices or systems and performing any incorporated methods. The patentable scope of the invention is defined by the claims, and may include other examples that occur to those of ordinary skill in the art. Such other examples are intended to be within the scope of the claims if they have structural elements that do not differ from the literal language of the claims, or if they include equivalent structural elements with insubstantial differences from the literal languages of the claims.

The invention claimed is:

1. A method comprising:
   receiving at least one positive point selection or negative point selection for a region of interest in a first image slice of an image sequence;
   mapping the first image slice and the at least one positive point selection or negative point selection to a first segmentation mask of the region of interest using a weakly supervised segmentation model;
   simulating positive and negative point selections in a second image slice based on the first segmentation mask to produce a plurality of simulated positive and negative point selections, wherein the second image slice is adjacent to the first image slice in the image sequence; and
   mapping the second image slice and the plurality of simulated positive and negative point selections to a second segmentation mask for the region of interest in the second image slice using the weakly supervised segmentation model.

2. The method of claim 1, the method further comprising:
   receiving at least one positive point selection or negative point selection for the region of interest in a third image slice, wherein the third image slice intersects the first image slice; and
   responding to a positive point selection or a negative point selection received for the third image slice intersecting the second image slice by:
      mapping the second image slice, the plurality of simulated positive and negative point selections, and the positive point selection or negative point selection intersecting the third image slice, to the second segmentation mask for the region of interest in the second image slice using the weakly supervised segmentation model.

3. The method of claim 1, the method further comprising:
   simulating positive and negative point selections in a third image slice based on the second segmentation mask to produce a second plurality of simulated positive and negative point selections, wherein the third image slice is adjacent to the second image slice in the image sequence; and
   mapping the third image slice and the second plurality of simulated positive and negative point selections to a third segmentation mask for the region of interest in the third image slice using the weakly supervised segmentation model.

4. The method of claim 1, wherein simulating positive and negative point selections in the second image slice based on the first segmentation mask comprises:
   generating a probability map for negative point selections based on the first segmentation mask; and
   generating a pre-determined number of negative point selections within a region of the second image slice, wherein the region corresponds to a set of locations of the probability map having above a first threshold probability of negative point selection, and below a second threshold probability of negative point selection.

5. The method of claim 4, wherein generating the probability map for negative point selections based on the first segmentation mask comprises:
   increasing a probability of negative point selection as a distance from a closest point of the region of interest in the first segmentation mask increases; and
   setting a probability of negative point selection to zero within the region of interest.

6. The method of claim 1, wherein simulating positive and negative point selections in the second image slice based on the first segmentation mask comprises:
   generating a probability map for positive point selections based on the first segmentation mask; and
   generating a pre-determined number of positive point selections within a region of the second image slice, wherein the region corresponds to a set of locations of the probability map having above a first threshold probability of positive point selection, and below a second threshold probability of positive point selection.

7. The method of claim 6, wherein generating the probability map for positive point selections based on the first segmentation mask comprises:
   increasing a probability of positive point selection as a distance from a closest point outside of the region of interest increases; and
   setting a probability of positive point selection to zero outside of the region of interest.

8. The method of claim 1, the method further comprising:
   receiving a request to remove one or more of the plurality of simulated positive and negative point selections in the second image slice;
   responding to the request by removing one or more of the plurality of simulated positive and negative point selections from the second image slice to produce an updated plurality of simulated positive and negative point selections;

mapping the second image slice and the updated plurality of simulated positive and negative point selections to an updated second segmentation mask using the weakly supervised segmentation model; and replacing the second segmentation mask with the updated second segmentation mask.

9. The method of claim 1, the method further comprising:
receiving a request to add one or more positive or negative point selections to the plurality of simulated positive and negative point selections in the second image slice;

responding to the request by adding the one or more positive or negative point selections to the plurality of simulated positive and negative point selections to produce an updated plurality of positive and negative point selections in the second image slice;

mapping the second image slice and the updated plurality of positive and negative point selections to an updated second segmentation mask using the weakly supervised segmentation model; and replacing the second segmentation mask with the updated second segmentation mask.

10. A method of producing a segmented three-dimensional (3D) region of interest (ROI) from an image sequence, comprising:
selecting an $i^{th}$ image slice from the image sequence, wherein i indicates a position within the image sequence;

receiving a positive or negative point selection for the ROI in the $i^{th}$ image slice;

mapping the $i^{th}$ image slice to an $i^{th}$ segmentation mask based on the positive or negative point selection, using a weakly supervised segmentation model;

generating a first plurality of simulated positive and negative point selections in a first adjacent image slice and a second plurality of simulated positive and negative point selections in a second adjacent image slice, based on the $i^{th}$ segmentation mask, wherein the first adjacent image slice is adjacent to the $i^{th}$ image in a first direction, and wherein the second adjacent image slice is adjacent to the $i^{th}$ image slice in a second direction;

mapping the first adjacent image slice to a first segmentation mask based on the first plurality of simulated positive and negative point selections, using the weakly supervised segmentation model;

mapping the second adjacent image slice to a second segmentation mask based on the second plurality of simulated positive and negative point selections, using the weakly supervised segmentation model;

rendering the $i^{th}$ segmentation mask, the first segmentation mask, and the second segmentation mask as the segmented 3D ROI; and displaying the segmented 3D ROI via a display device.

11. The method of claim 10, wherein rendering the $i^{th}$ segmentation mask, the first segmentation mask, and the second segmentation mask as the segmented 3D ROI includes:
superimposing the segmented 3D ROI over the image sequence; and displaying the positive or negative point selection for the ROI in the $i^{th}$ image slice, along with the first plurality of simulated positive and negative point selections in the first adjacent image slice, and the second plurality of simulated positive and negative point selections in the second adjacent image slice.

12. The method of claim 10, wherein generating the first plurality of simulated positive and negative point selections in the first adjacent image slice and the second plurality of simulated positive and negative point selections in the second adjacent image slice, based on the $i^{th}$ segmentation mask comprises:
generating a probability map for positive and negative point selections based on the $i^{th}$ segmentation mask; and placing a first pre-determined number of positive point selections in each of the first adjacent image slice and the second adjacent image slice based on the probability map; and placing a second pre-determined number of negative point selections in each of the first adjacent image slice and the second adjacent image slice based on the probability map.

13. The method of claim 12, wherein generating a probability map for positive and negative point selections based on the $i^{th}$ segmentation mask comprises:
determining a probability of negative point selection based on a distance from the ROI in the $i^{th}$ segmentation mask, wherein a probability of negative point selection is set to zero within the ROI, and wherein the probability of negative point selection increases as a distance from the ROI increases.

14. The method of claim 12, wherein generating a probability map for positive and negative point selections based on the $i^{th}$ segmentation mask comprises:
determining a probability of positive point selection based on a distance from non-ROI regions in the $i^{th}$ segmentation mask, wherein a probability of positive point selection is set to zero in non-ROI regions, and wherein the probability of positive point selection increases as a distance from non-ROI regions in the $i^{th}$ segmentation mask increases.

15. A three-dimensional (3D) region segmentation system comprising:
a user input device;
a display device;
a non-transitory memory storing a weakly supervised segmentation model, and instructions; and
a processor communicatively coupled to the user input device, the display device, and the non-transitory memory, wherein, when executing the instructions, the processor is configured to:
receive via the user input device a positive point selection or negative point selection for a region of interest (ROI) in a first image slice of an image sequence;

map the first image slice and the positive point selection or negative point selection to a first segmentation mask of the ROI using the weakly supervised segmentation model;

simulate positive and negative point selections in a second image slice based on the first segmentation mask to produce a plurality of simulated positive and negative point selections, wherein the second image slice is adjacent to the first image slice in the image sequence;

map the second image slice and the plurality of simulated positive and negative point selections to a second segmentation mask for the ROI in the second image slice using the weakly supervised segmentation model;

render the first segmentation mask and the second segmentation mask as a 3D region; and display the 3D region via the display device.

16. The 3D region segmentation system of claim 15, wherein the processor is configured to simulate positive and negative point selections in the second image slice based on the first segmentation mask by:
  generating a probability map for negative point selections based on the first segmentation mask; and
  placing a pre-determined number of negative point selections within a region of the second image slice, wherein the region corresponds to a set of locations of the probability map having above a first threshold probability of negative point selection, and below a second threshold probability of negative point selection.

17. The 3D region segmentation system of claim 15, wherein the processor is configured to simulate positive and negative point selections in the second image slice based on the first segmentation mask by:
  generating a probability map for positive point selections based on the first segmentation mask; and
  placing a pre-determined number of positive point selections within a region of the second image slice, wherein the region corresponds to a set of locations of the probability map having above a first threshold probability of positive point selection, and below a second threshold probability of negative point selection.

18. The 3D region segmentation system of claim 15, wherein, when executing the instructions, the processor is further configured to:
  evaluate if the second image slice and second segmentation mask satisfy one or more stopping criterion; and
  respond to the second image slice and the second segmentation mask not satisfying the one or more stopping criterion by:
    simulating positive and negative point selections in a third image slice based on the second segmentation mask to produce a second plurality of simulated positive and negative point selections, wherein the third image slice is adjacent to the second image slice in the image sequence; and
    mapping the third image slice and the second plurality of simulated positive and negative point selections to a third segmentation mask for the ROI in the third image slice using the weakly supervised segmentation model.

19. The 3D region segmentation system of claim 18, wherein the one or more stopping criterion includes an area of the second segmentation mask being below a segmentation mask area threshold.

20. The 3D region segmentation system of claim 15, wherein, when executing the instructions, the processor is further configured to:
  evaluate if the second image slice and second segmentation mask satisfy one or more stopping criterion; and
  respond to the second image slice and the second segmentation mask satisfying the one or more stopping criterion by:
    ceasing segmentation of the ROI in a direction of propagation of the second image slice.

* * * * *